(12) United States Patent
Fiala

(10) Patent No.: US 6,957,891 B2
(45) Date of Patent: Oct. 25, 2005

(54) OPHTHALMIC LENS WITH SURFACE STRUCTURES

(76) Inventor: Werner J. Fiala, Suedrandstrasse 15, A-1230 Vienna (AT)

(*) Notice: Subject to any disclaimer, the term of this patent is extended or adjusted under 35 U.S.C. 154(b) by 112 days.

(21) Appl. No.: 09/967,450

(22) Filed: Sep. 28, 2001

(65) Prior Publication Data
US 2002/0063848 A1 May 30, 2002

Related U.S. Application Data
(60) Provisional application No. 60/236,773, filed on Sep. 29, 2000.

(51) Int. Cl.[7] .................................................. G02C 7/04
(52) U.S. Cl. ............................ 351/160 R; 351/160 H; 351/161
(58) Field of Search ...................... 351/160 R, 160 H, 351/161, 162, 177

(56) References Cited

U.S. PATENT DOCUMENTS

| | | | |
|---|---|---|---|
| 4,055,378 A | | 10/1977 | Feneberg et al. |
| 4,618,227 A | | 10/1986 | Bayshore |
| 4,637,697 A | | 1/1987 | Freeman |
| 4,890,911 A | * | 1/1990 | Sulc et al. ............... 351/160 H |
| 4,932,970 A | * | 6/1990 | Portney ..................... 623/6.25 |
| 5,009,497 A | | 4/1991 | Cohen |
| 5,044,742 A | * | 9/1991 | Cohen ......................... 351/161 |

FOREIGN PATENT DOCUMENTS

| | | |
|---|---|---|
| EP | 0 605 841 A1 | 7/1994 |
| WO | WO 89/07281 | 8/1989 |
| WO | WO 97/24639 | 7/1997 |

\* cited by examiner

*Primary Examiner*—Scott J. Sugarman
(74) *Attorney, Agent, or Firm*—Hoffmann & Barron, LLP

(57) ABSTRACT

A lens, particularly a contact lens, including surface structures on at least one of the lens surfaces. The surface structures improve lubrication conditions of the lens and increase lens comfort. Within the optical portion of the lens the surface structures comprise annular grooves of given depth and shape such that the optical performance of the lens is not adversely affected by these grooves. Appropriate surface structures on the non-optical portion may be formed in any shape and geometry.

25 Claims, 16 Drawing Sheets

OPHTHALMIC LENS WITH SURFACE STRUCTURES

This application claims the benefit of U.S. Provisional Application No. 60/236,773, filed on Sep. 29, 2000.

BACKGROUND OF THE INVENTION

1. Field of the Invention

The invention relates in general to ophthalmic lenses and, more particularly to contact lenses, both of the rigid and soft type having surface structures on at least one surface thereof.

2. Description of the Prior Art

Contact lenses are frequently used to correct refractive error of the eye. Overwhelmingly, contact lenses are used to correct the vision of humans, but occasionally contact lenses are also applied on animal eyes.

Early contact lenses were made of rigid plastics. The majority of present day contact lenses are made of soft hydrogels, since soft contact lenses generally offer superior wearing comfort. Still, rigid lenses are used by a sizeable portion of the population because of ease of handling and due to certain kinds of refractive error (e.g. astigmatism) being more readily corrected by rigid lenses.

Lens comfort is an issue with both rigid and soft contact lenses. Lens comfort is largely determined by the lens-eye-configuration, and, in particular, by the presence and amount of tear fluid between the lens surface and the cornea as well as by the tear layer on the front surface of the lens.

The surfaces of all present contact lenses are substantially smooth, and care is taken to eliminate any surface alterations on both the front and the back surfaces of standard monofocal contact lenses. The only exception are bifocal diffractive lenses which usually exhibit minor steps on the back surface. This applies both for rigid and soft contact lenses. With rigid contact lenses, a smooth surface is achieved e.g. by polishing. The cornea surface is also a smooth surface. Consequently, the tear layer has to provide lubrication between two smooth surfaces.

Therefore, a limitation of currently available contact lenses is a potential breakdown of tear fluid between the cornea surface and the contact lens making the lenses uncomfortable to wear and/or requiring the wearer to use lubricating eye drops. The present invention is directed to a contact lens which provides enhanced comfort and better lubrication between the cornea surface and lens surface.

OBJECTS AND SUMMARY OF INVENTION

It will be shown that properly designed fine surface structures on one or both surfaces of a contact lens do not result in inferior optical properties of such lenses and provide superior comfort.

Since improved lubrication of contact lenses leads to increased lens comfort, such fine surface structures on one or both of the lens surfaces may even lead to an improvement of the perceived or objective optical properties.

It is therefore an object of the present invention to provide a contact lens which exhibits fine surface structures on one or on both of its surfaces.

It is a further object of the present invention to provide a contact lens with superior hydrodynamic properties.

It is a particular object of the present invention to provide a contact lens of increased comfort.

It is a further object of the present invention to provide a contact lens with improved perceived optical qualities.

It is still another object of the present invention to provide a contact lens with improved objective optical properties.

It is a further object of the present invention to provide an ophthalmic lens with improved objective optical properties.

In the following description, the term "contact lens" refers to both a rigid and a soft contact lens. The term "ophthalmic lens" refers to both a contact lens and a rigid or soft intra-ocular lens.

State of the art monofocal contact lenses and ophthalmic lenses invariably exhibit a smooth front surface and a smooth back surface. In most of ophthalmic lenses these surfaces are spherical surfaces. Then the radius of the spherical front surface, $R_F$, and the radius of the spherical back surface, $R_B$, are interdependent and are given by the known "thick lens formula"

$$D = \left( \frac{1}{R_F - t + t\frac{n_{imm}}{n_L}} - \frac{1}{R_B} \right) \times (n_L - 1)$$

wherein D is the lens power, t is the center thickness, $n_L$ is the refractive index, $n_{imm}$ is the refractive index of the medium the lens is immersed in ($n_{imm}=1$ for a contact lens), $R_F$ is the front radius and $R_B$ is the back radius of the lens.

For special applications, lenses are also known in which either one or both of the surfaces are not spherical but aspheric surfaces, e.g. progressive multifocal lenses. It is common to all of these lenses that both surfaces are smooth, i.e. as smooth as possible, which is occasionally achieved by polishing. State of the art monofocal ophthalmic lenses exhibit either polished surfaces or surfaces the quality of which is substantially equivalent to polished surfaces. The latter applies to molded lenses, to spin cast lenses and to lenses which are cut on "polish-free" high precision diamond lathes. In present state of the art monofocal lenses, any visible local deviation of a surface element from the general curvature of the lens is a lens error and therefore considered unacceptable. Critical visibility's for lens errors are, e.g., defined in European Standard EN ISO 9341.

Also in the case of diffractive and/or refractive multifocal lenses, one of the two surfaces is made smooth to the best possible degree of perfection, while the opposite lens surface may exhibit some diffractive or refractive surface structures.

The present invention is directed to a standard state of the art lens as described above which has been modified such that either the front surface or the back surface or both lens surfaces include means for increasing a surface area comprising surface structures, such as visible substantially annular grooves. The grooves may be cut such that the curvature within the grooves is different from the curvature of the original lens surface. The assembly of such grooves represents fine surface structures. The geometry of these grooves is chosen such that the lens, including such substantially annular grooves, essentially exhibits the same light intensity in its single power in the case of a monofocal lens, or the same intensities in the principal powers in the case of a multifocal lens. It will be understood that the same result, i.e. the same lens with grooves or fine surface structures, can be produced by other lens production techniques, such as e.g. molding.

In accordance with one form of the present invention, the surface structures are provided only on the non-optical portion of the lens. In this instance, the surface structures may take any shape and/or geometry. If the surface structures are provided as a plurality of annular grooves, the grooves may be defined as having a depth t measured from an envelope comprising a smooth curve at said surface such that a value t $(n_L-n_i)$ is larger than $\lambda/14$, $\lambda$ being the wavelength of light, $n_L$ being the refractive index of the lens and $n_i$ being the refractive index of the medium within the groove.

In accordance with another form of the present invention, the lens is divided into annular zones of equal area. Such zones are usually called "Fresnel zones". The powers within the zones are not uniform and not equal powers, but follow a certain function, i.e. the zones exhibit a power profile. Averaging of the power profile across a zone results in the determination of an average power attributed to this zone. The average powers of all annular zones are to be identical. These power profiles may or may not be periodic in $r^2$-space, wherein the direction of r is the perpendicular direction to the lens axis. The lens is then shaped such that the geometric profiles within the zones provide these power profiles. The bulk lens, as a consequence, then exhibits alterations or fine structures on the front or the back surface or on both these surfaces. A proper design of such power profiles and the emerging geometric zone structures assures that the bulk lens performs essentially like a monofocal lens of single power equal with the average zone powers, i.e. the surface structures do not compromise the optical properties of the lens.

In accordance with another form of the present invention, the lens is divided into annular zones of unequal area. Again the geometries of the zones are designed such that the zones exhibit power profiles. Since the zones are not of the Fresnelian type, such power profiles are never periodic in $r^2$-space. The average power of all zones again are identical. Due to the power profiles, the zones exhibit alterations or surface structures on one or both of their outer surfaces. A proper design of the power profiles and the emerging surface structures assures that the bulk lens performs essentially like a monofocal lens of single power which is equal with the average zone powers.

In accordance with still another form of the present invention, a front surface of a lens is designed according to the above-mentioned conditions, leading to the definition of a set of parameters of such a front surface. A multifocal lens with back surface optics is then given a front surface according to the set of parameters of such a front surface. The multifocal diffractive lens preferably may include annular zones exhibiting periodic power profiles wherein a light intensity in the zeroth diffractive order is at least 90% of the total transmitted light intensity, i.e., ten (10) times larger than the light intensity in any other power of the multifocal diffractive lens.

In accordance with a further form of the present invention, a back surface of a lens is designed according to the above-mentioned conditions, leading to the definition of a set of parameters of such a back surface. A multifocal lens with front surface optics is then given a back surface according to the set of parameters of such a back surface.

In a still further embodiment of the present invention, an ophthalmic lens of power D includes at least two annular zones formed on a surface thereof. A refractive power within any annular zone is a variable according to a power profile and an average refractive power within any annular zone is substantially equal to D. Furthermore, the difference between a maximum value and a minimum value of the power profile within at least one zone is greater than one diopter.

Still other forms of the present invention will become apparent from the following discussion of preferred embodiments.

DETAILED DESCRIPTION OF THE PREFERRED EMBODIMENTS

It is known from hydrodynamics that lubricant break-up may occur when the lubricant is present between two smooth surfaces. As a consequence, fine surface structures are occasionally provided on one or both of the opposite lubricated surfaces to prevent lubricant break-up and to avoid direct physical contact between these surfaces. Compared to a smooth surface, a surface with structures provides a larger surface area between the lubricant and the lubricated surface. Consequently, the attractive forces between the surface and the lubricant can be increased by providing the surface with adequate structures.

Such an approach has never been considered in the case of contact lenses. It is contemplated by the present invention that properly designed fine surface structures lead to improved lubrication properties and, consequently, improved lens comfort. However, the apparent assumption is that any fine surface structures on lenses would lead to a degradation of the optical properties of such lenses. It will be shown below that a lens can be constructed to include surface structures without degrading the optical properties of the lens.

The present invention generally comprises providing surface structures on either the front, back or both surfaces of a lens, which do not degrade the optical properties of the lens. It has been found that such surface structures provide enhanced lens wearer comfort. The surface structures may take any shape or geometry when formed in the non-optical portion of the lens. Alternatively, the surface structures may comprise a plurality of annular grooves on any portion of a lens surface, including the optical portion. The grooves may have a spherical or non-spherical cross-section. Provided below are several examples of lenses including surface structures formed in accordance with the present invention.

Preliminary in vivo tests with contact lenses according to the present invention have provided strong evidence of increased comfort and improved visual quality associated with such lenses.

The reasonability of designing ophthalmic lenses according to the present invention has to be judged fundamentally from the optical properties of such lenses. Consequently, the optical properties of a lens which produces a wavefront departing from the purely spherical shape within certain regions is now discussed.

Ideally, a lens is a device which converts an incoming spherical wavefront into another spherical wavefront. The incoming wavefront is centered about the object point, and the outgoing wavefront is centered about the conjugated image point. If the object point is at infinity, then the conjugated image point is the focal point of the lens.

Figure 1:
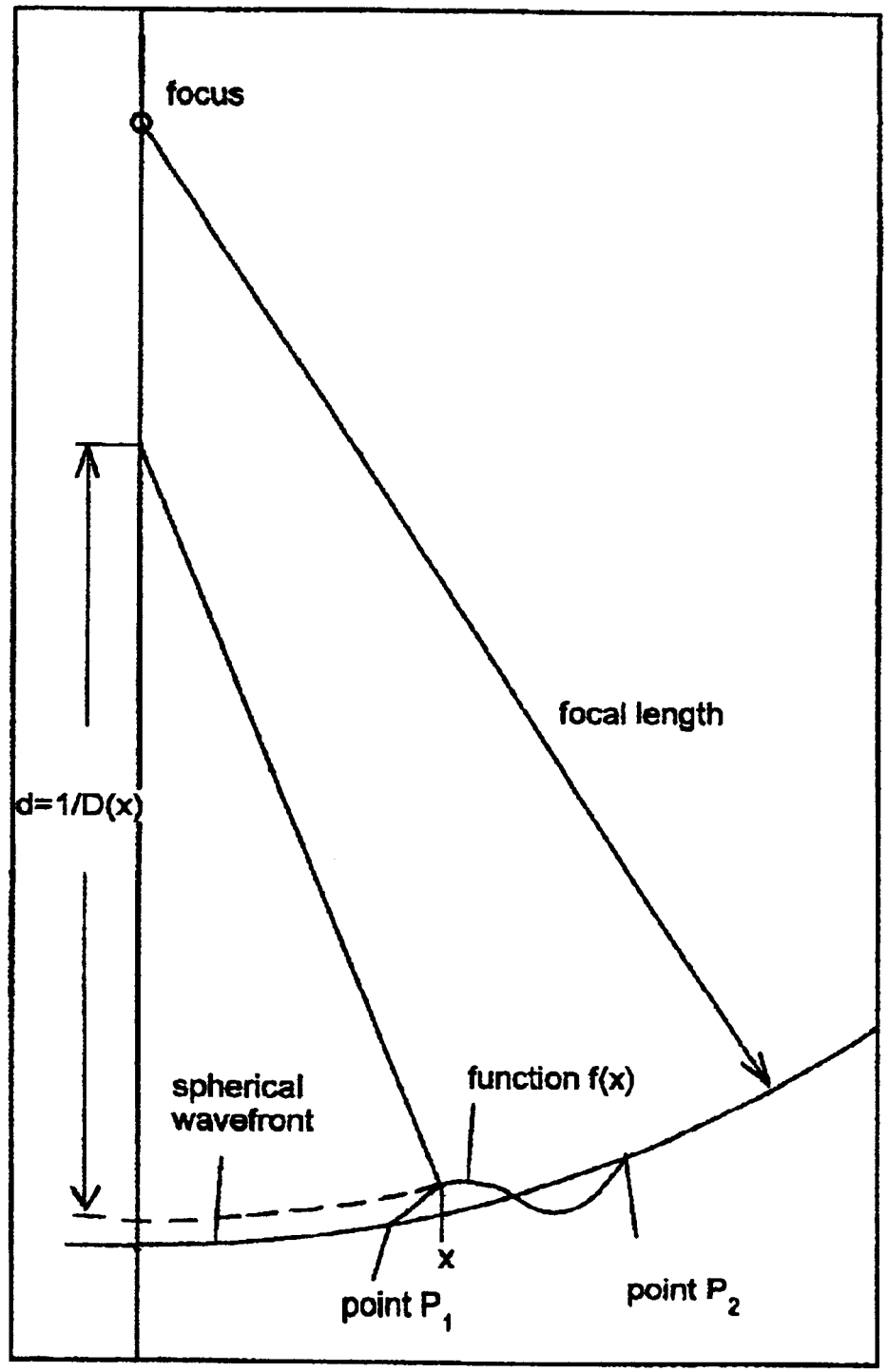
FIG. 1 is a view of a spherical wavefront of a thin lens in its principal plane wherein a portion of said wavefront is approximated by a non-spherical function.

FIG. 1 shows an outgoing spherical wavefront in the principal plane of a thin lens. Since rotational symmetry prevails, the spherical wavefront can be represented in two dimensions only, i.e. the spherical wavefront is characterized in the meridian plane by a circle the radius of which is the focal length or inverse lens power. It will now be shown, first, that the average power of a wavefront which can be represented by a function f(x), wherein the function f(x) connects two points $P_1$ and $P_2$ on the spherical wavefront is, under certain restrictions, essentially equal with the power associated with the spherical wavefront. This statement will be called "Lemma 1".

Consider in FIG. 1 the differential wavefront at a distance x from the lens axis. This differential wavefront directs light essentially into a position which is d=1/D(x) behind the vertex of the spherical wavefront, wherein D(x) is the associated power of this differential wavefront. The line connecting this differential wavefront and the associated point on the lens axis is perpendicular to the inclination f'(x) of this differential wavefront.

The distance d can easily be calculated, the result being $$d = \sqrt{x^2 + \frac{x^2}{f'(x)^2}} \quad (1)$$

The associated differential power D(x)=1/d is then $$D(x) = \frac{f'(x)}{x\sqrt{1+f'(x)^2}} \quad (2)$$

The average power $D_{av}$ of the wavefront between the two points $P_1(x_1,y_1)$ and $P_2(x_2,y_2)$, wherein $P_1$ and $P_2$ are points on the spherical wavefront, is given by $$D_{av} = \frac{2\pi \int_{x_1}^{x_2} xD(x)dx}{2\pi \int_{x_1}^{x_2} xdx} \quad (3)$$

Introduction of equation (2) into equation (3) and rearranging results in $$D_{av} = \frac{2}{x_2^2 - x_1^2} \int_{x_1}^{x_2} \frac{f'(x)}{\sqrt{1+f'(x)^2}} dx \quad (4)$$

The integral in equation (4) is not easily solved, but it can be computed numerically for any appropriate function f(x). The above Lemma 1 implies that the integral of equation (4) is essentially path independent. This integral is now indeed practically path independent, if the following condition holds for all values x of the function f(x):

$$f'(x)^2 \ll 1 \quad (5)$$

because then equation (4) can easily be solved and the average power is given by $$D_{av} \approx 2\frac{f(x_2) - f(x_1)}{x_2^2 - x_1^2} \quad (6)$$

Since one of the possible paths between point $P_1$ with coordinates $x_1$, $f(x_1)$ and the point $P_2$ with coordinates $x_2$, $f(x_2)$ is the circle associated with the spherical wavefront, the average power $D_{av}$ is essentially equal with the power associated with this spherical wavefront.

The condition (5) is satisfied for all cases where the (absolute) focal length D(x) is large in comparison with the lens dimensions, since then, as will be appreciated, f'(x) is always a very small value.

Restriction (5) is actually a safe assumption. It would be sufficient to demand that the squared difference between the derivative of a function f(x) connecting the two points on the spherical function $f_{sph}(x)$ and the derivative of this spherical function $f_{sph}(x)$ is small within the entire interval, i.e.

$$[f'(x) - f'_{sph}(x)]^2 \ll 1 \quad (5')$$

wherein $$f'_{sph}(x) = \frac{x}{\sqrt{F^2 - x^2}}$$

and F is the focal length of the spherical wavefront. But since in typical situations of ophthalmic lenses condition (5)

is satisfied, we base this discussion on the strict condition (5), because the related considerations are much easier to discuss. To substantiate the foregone statement about ophthalmic lenses, consider a lens of 8 mm diameter and a power of 10 diopters, i.e. focal length 100 mm. Then, the maximum value for the derivative $f'_{sph}(x=4 \text{ mm})$ is 0.04, and the squared derivative is 0.0016, which value can be considered very small compared to 1.

For the purpose of illustration, the average powers between two points of a spherical wavefront are calculated when the two points are connected by a linear function $$y = y_1 + \frac{y_2 - y_1}{x_2 - x_1}(x - x_1) \tag{7}$$

Then $f'(x)=y'$ is always a constant and equation (4) can easily be integrated. In connecting two points of a spherical wavefront with a straight line, the spherical wavefront between these two points is substituted by a cone-shaped wavefront.

Figure 2:
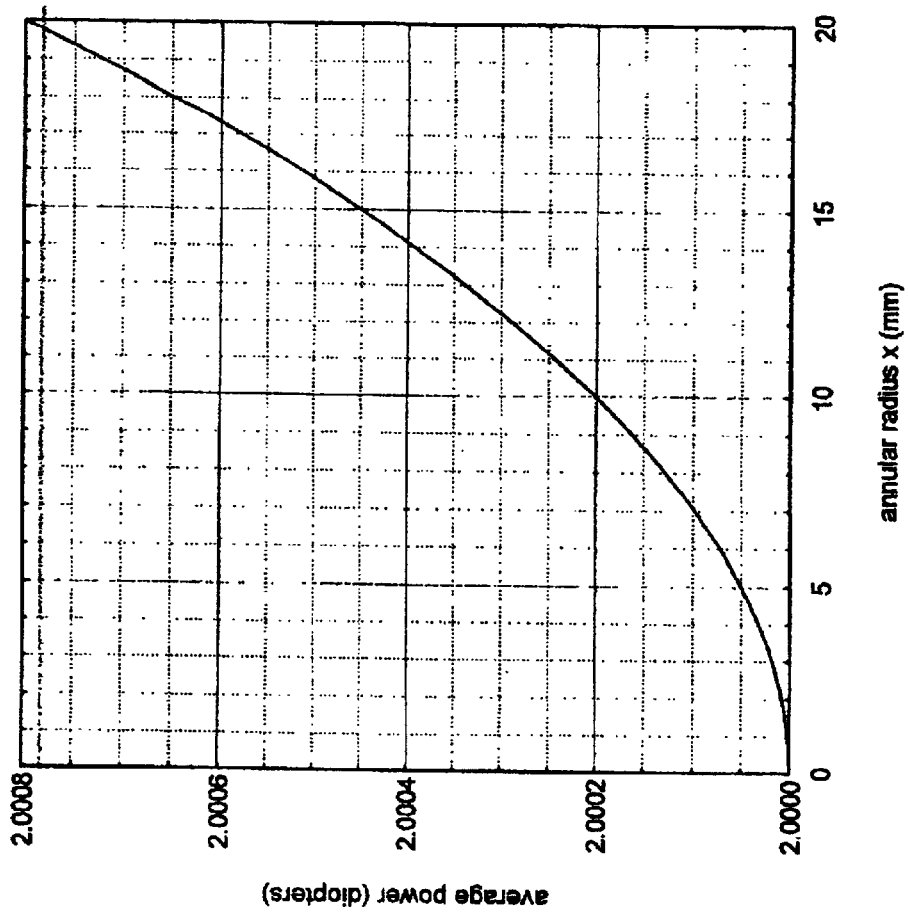
FIG. 2 illustrates the average power of a cone-shaped wavefront in dependence of the diameter of this wavefront.

In FIG. 2, the result is shown for a spherical wavefront of associated power 2 diopters (focal length=500 mm). The innermost point for the results in FIG. 2 is the point with coordinates $x_1=0$ and $y_1=0$. The x-coordinate of the second point on the spherical wavefront assumes values between 0 and 20 mm. As can be seen from FIG. 2, the average power between such two points is very close to the power of 2 diopters associated with the spherical wavefront.

We may now generalize the above results and formulate "Lemma 2": The average power associated with a wavefront between two points, which wavefront is represented by a function $f(x)$, is essentially equal with the power of a spherical wavefront through these two points and centered about a point on the lens axis, as long as $f'(x)^2 \ll 1$. Accordingly, Lemma 1 and Lemma 2 are actually equivalent.

With this it is demonstrated that a wavefront of arbitrary shape can be approximated by a spherical wavefront as long as the above mentioned restrictions are satisfied.

But in order to achieve an essentially monofocal lens with substantial intensity in a single power only, it is not sufficient that the average powers within different annular zones are equal. For example, in the case of annular zones of equal area, i.e. Fresnelian zones, it was shown that power profiles within the zones which are periodic in $r^2$-space give rise to a multifocal diffractive lens (see: W. Fiala and J. Pingitzer: Analytical approach to diffractive multifocal lenses, Eur. Phys. J. AP 9,227–234 (2000) the disclosure of which is incorporated herein by reference). If we calculate a zone power profile from the surface profile of a lens, a similar statement applies also for a diffractive multifocal lens according to U.S. Pat. No. 5,760,871 to Kosoburd et. al.

For ease of argument, presently we adhere to the concept of zone power profiles rather than geometric zone profiles. To one knowledgeable in the art, it is understood how a zone power profile transforms into a geometric zone profile and vice versa. For the sake of completeness it is mentioned that a zone power profile can also be produced by a zone with surface structures on both the front and the back surface.

If a lens with power profiles in its annular zones should exhibit essentially only one power, constructive interference in other powers has to be suppressed. As will be shown, this can be achieved in various ways:

It is, for example, possible to design a lens with non-Fresnelian zones. Then, the power profiles within the individual zones are not periodic in $r^2$-space.

Another possibility is to design a lens with Fresnelian zones, but design the individual power profiles in such a way that they are not periodic in $r^2$-space.

It is still possible to design a lens with Fresnelian zones and power profiles which are periodic in $r^2$-space. Such a lens has usually two or three main powers, a power in the zeroth and the $+1^{st}$ an/or $-1^{st}$ diffractive order. By proper power profile design it can be achieved, though, that close to 100% of the available intensity is directed into the zeroth diffractive power, and essentially no intensity in any other diffractive power.

Figure 3:
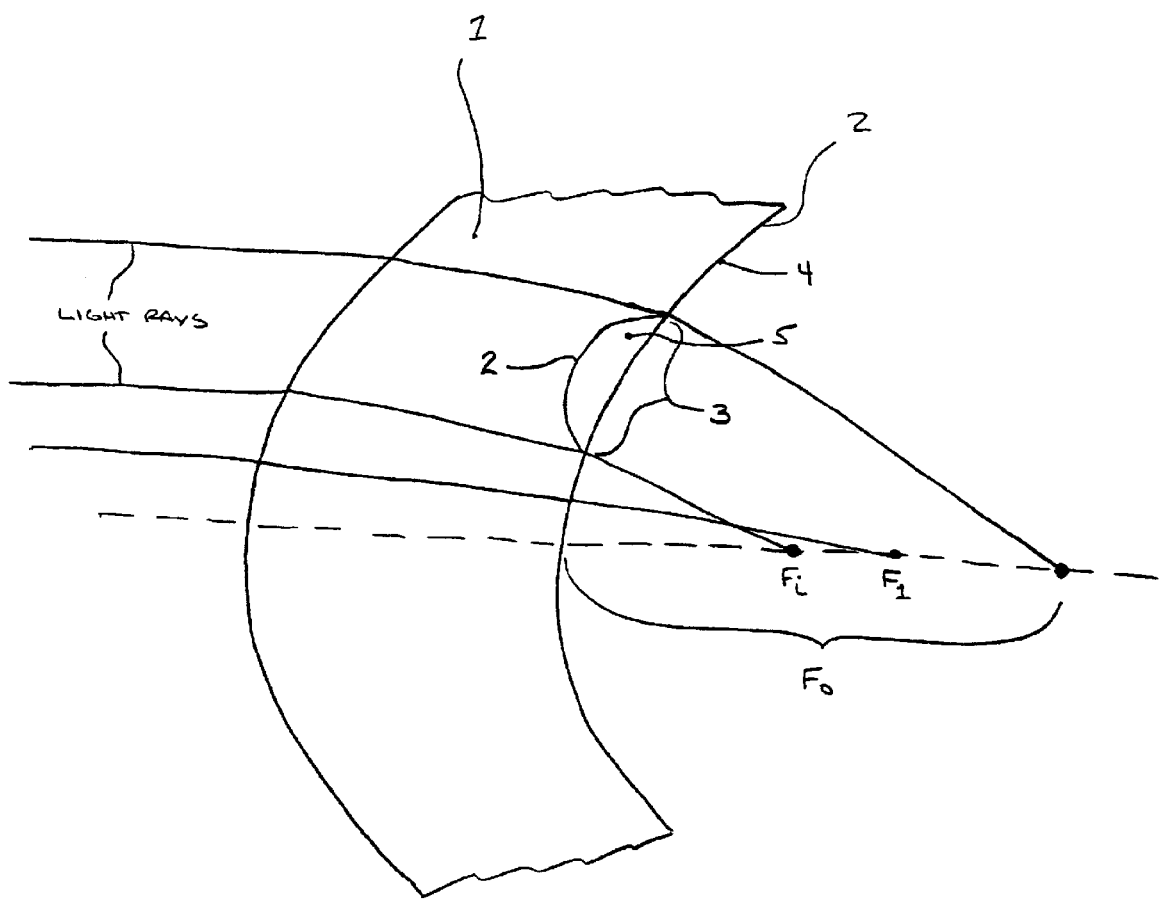
FIG. 3 illustrates local powers associated with surface structures on the back surface of a contact lens.

Examples of zone power profiles will be given now which result in lenses of essentially a single power only. First, the general shape of a useful zone power profile is discussed. Referring to FIG. 3, it is desirable to place the fine surface structures on the back surface of a contact lens 1, the curvature of the back surface 2 of an individual zone 3 has to be larger than the surface of the cornea 4. Usually the index of refraction of the material of lens 1 is larger than the index of the tear fluid 5 between the back surface 2 and the cornea 4. This implies immediately that the focal length $F_i$ in the vicinity of the inner part of the zone is smaller than the focal length $F_o$ in the vicinity of the outer part of the zone. Calling $F_1$ the focal length of the lens within a zone of standard front and back surface, the condition $$F_i < F_l < F_o \tag{8}$$

prevails.

Figure 4:
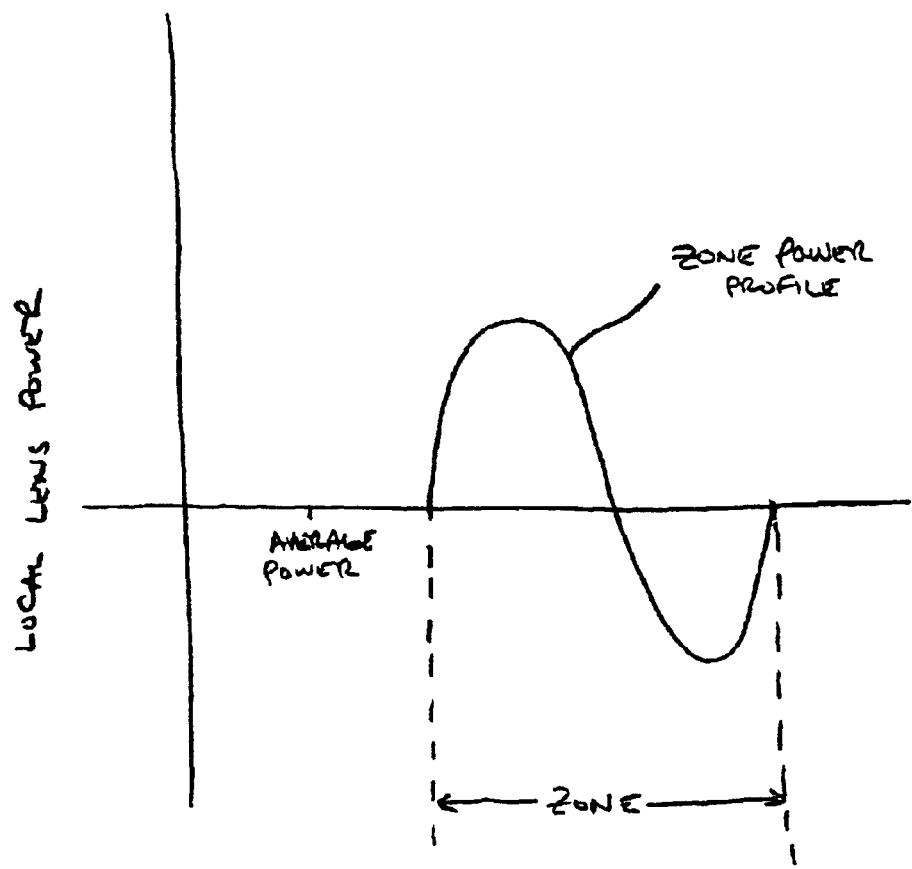
FIG. 4 illustrates the principal shape of a zone power profile for a lens with surface structures on the back surface of a contact lens.

Since the power is the inverse of the focal length, this implies that the zone power profile for a contact lens with fine surface structures on the back surface starts with an increase to a differential power which is larger than the average power, and that the zone power profile then is described by increasingly smaller powers when the distance from the lens axis is increased within the considered zone. FIG. 4 is a graph for the principal shape of such a zone power profile.

For a contact lens with fine surface structures on the front surface, no general restriction on the zone power profile exists. As will be appreciated, the same applies for the power profile of an intra-ocular lens with fine structures on either the back surface or the front surface.

Figure 5:
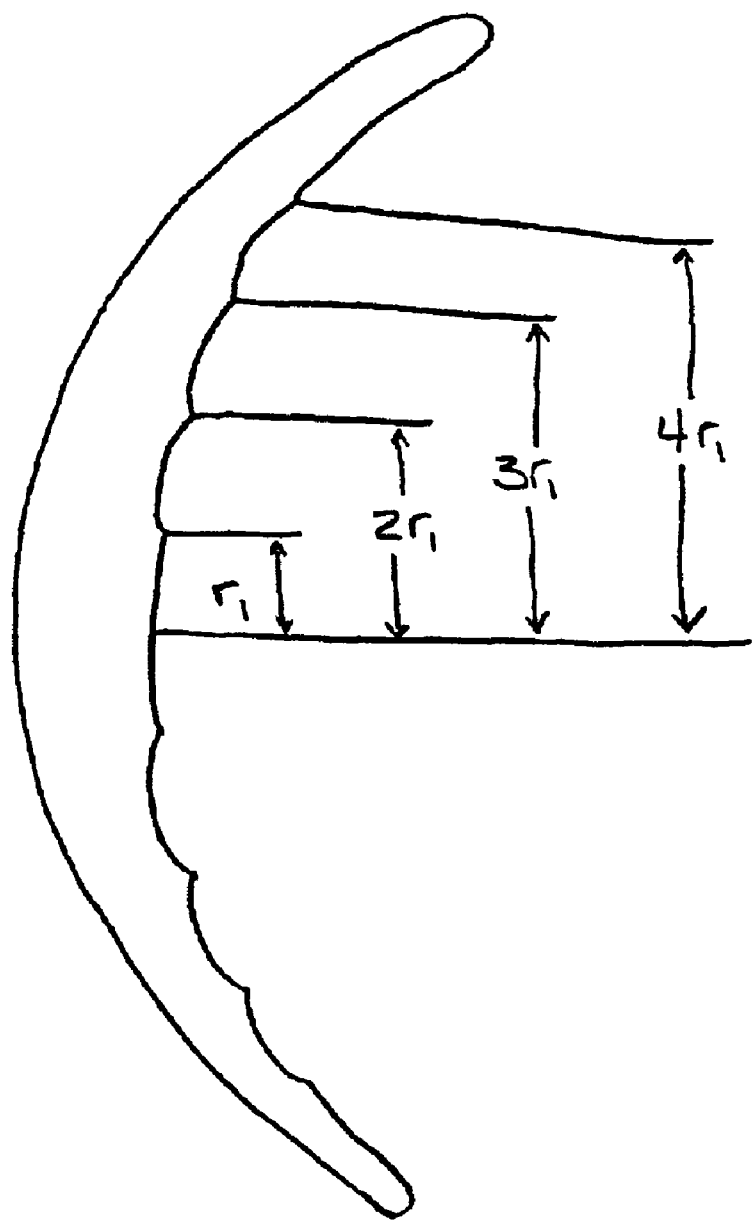
FIG. 5 illustrates schematically the shape of a contact lens with surface structures on the back surface.

In a preferred embodiment, a lens is divided into annular zones. The outer bonding radius of zone j is called $R_j$. If the entire (optical) area of the lens should be covered by annular zones, i.e. if no spacings are provided between annular zones, then the inner annular radius of the j-th zone is given by $R_{j-1}$. Then we may design the zones in such a way that $$R_j = R_1 \times j^\alpha \tag{9}$$

where $\alpha$ is an exponent. If $\alpha=\frac{1}{2}$, Fresnelian zones as provided; if $\alpha=1$, zones with equal annular width are provided. FIG. 5 is a schematic view of a contact lens with zones on the back surface of equal annular widths, i.e. $\alpha=1$. It is noted that for any value $\alpha \neq \frac{1}{2}$ the zones are non-Fresnelian, which, in view of the above, may be advantageous.

With modern computing tools it is easy to investigate different annular zone power profiles and select the proper ones which may lead to practical embodiments of lenses. As previously discussed, the transformation of suitable zone power profiles into lens embodiments is state of the art and e.g. described in the aforementioned article by W. Fiala and J. Pingitzer.

As a first example, a lens is provided which is divided into non-Fresnelian zones of equal annular width. For the sake of simplicity, lenses of 5 mm diameter only are considered in this discussion. It will be understood that the following considerations apply equally also for lenses of larger diameter. Furthermore, it is contemplated that the surface structures may actually extend over the entire lens area, including the non-optical outer annular region.

Figure 6:
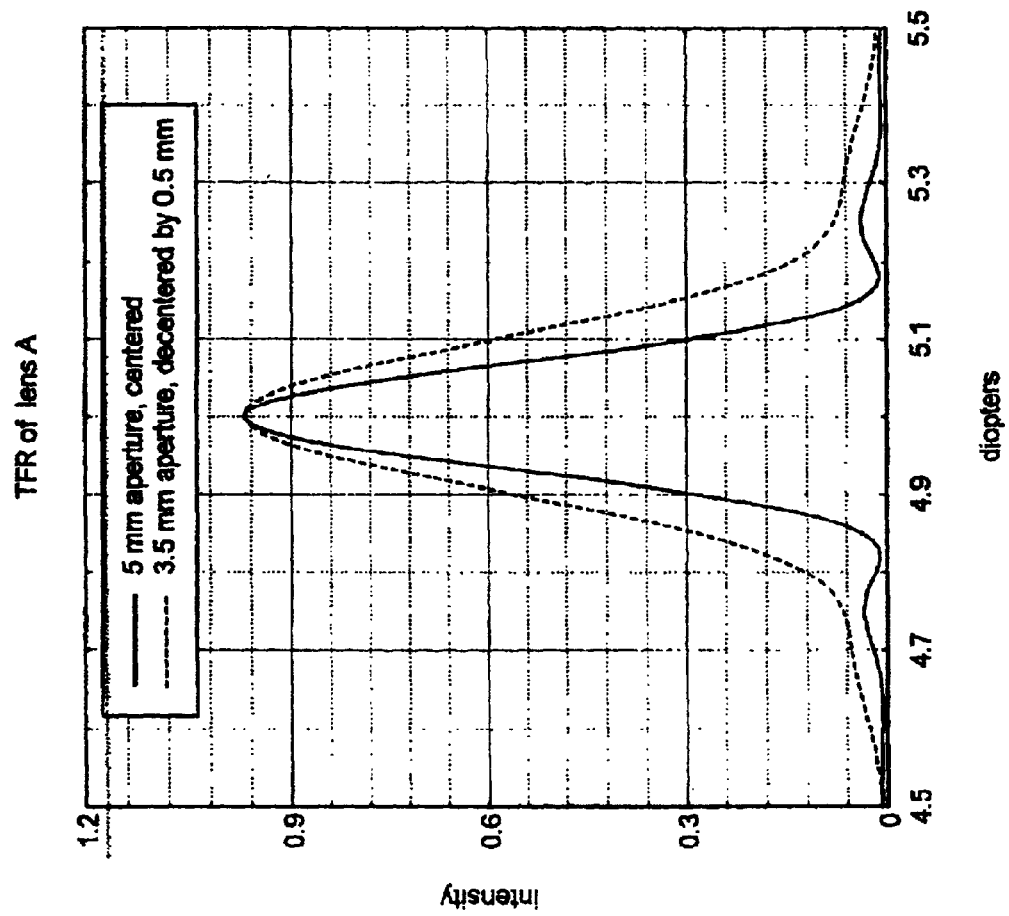
FIG. 6 illustrates the through focus response (TFR) of a lens with surface structures within annular zones of equal width on the back side of a contact lens.

The lens—called "lens A" henceforth—is divided into 8 annular zones. Then, every zone has an annular width of 0.3125 mm. By way of example, the innermost zone exhibits standard front and back surfaces. Within any of zones 2 through 8 the spherical wavefront is substituted by a cone-shaped wavefront which is obtained by connecting the zone end points on the spherical wavefront with straight lines. The through focus response (TFR) was calculated for the lens with such a power profile in the zones, the result being shown in FIG. 6. FIG. 6 also shows the TFR for a decentered aperture and for the case of polychromatic light. The polychromatic light spectrum was assumed to be rectangular and extending from 450 nm to 650 nm. As can be seen, this lens exhibits close to 100% of the intensity in the nominal power of 5 diopters, which power, as explained above, is the average power of the zone power profiles. This applies for both the monochromatic and polychromatic intensities, as well as for the centered and the decentered apertures.

Figure 7:
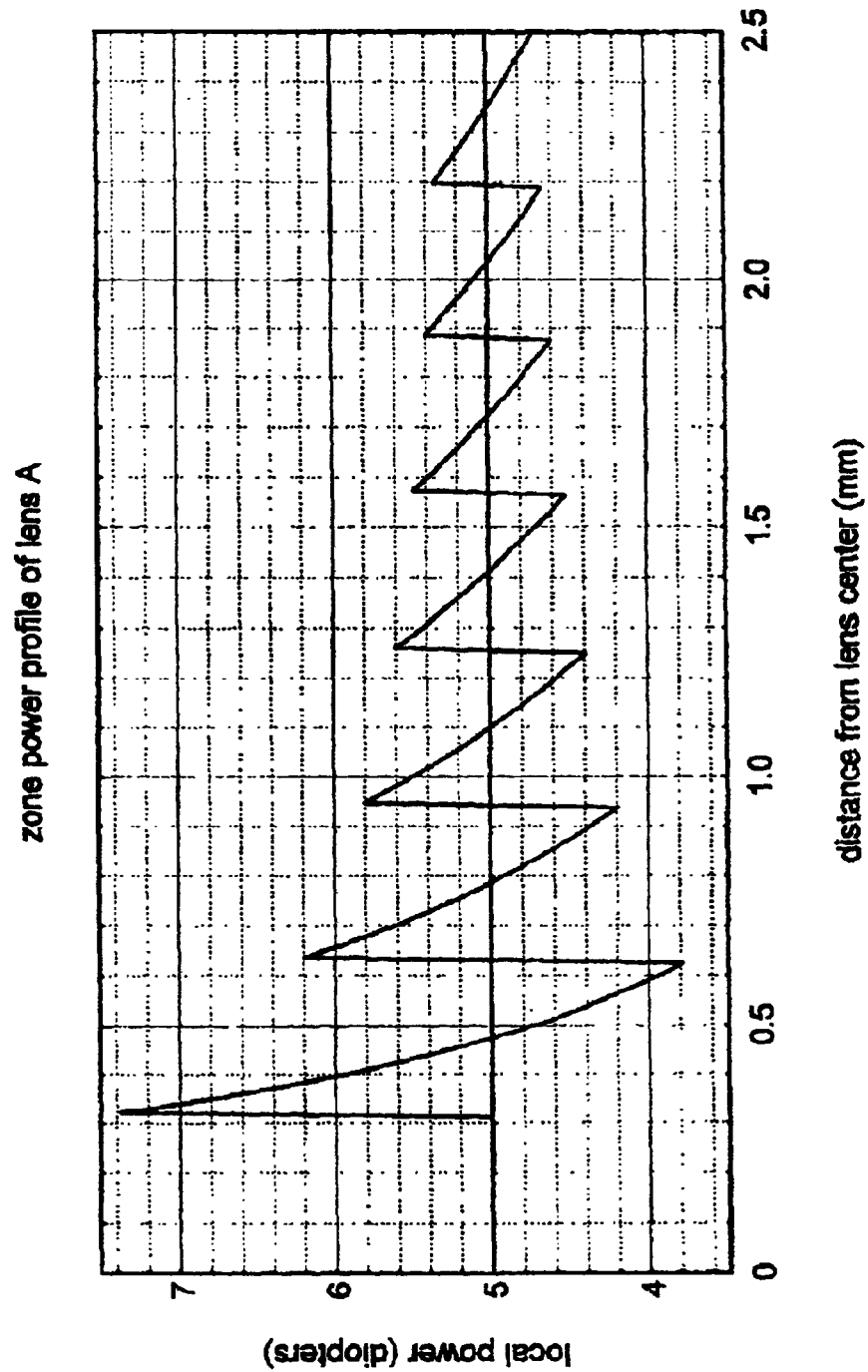
FIG. 7 illustrates zone power profiles of a lens with annular zones of equal width which exhibits surface structures on one of their outer surfaces.

The zone power profiles for lens A are shown in FIG. 7. The abrupt changes of local power at the junctions between two adjacent zones are due to the fact that the theoretical geometric zone junctions are not made smooth. In practice, these geometric junctions will not exhibit "sharp" corners and the associated zone power profiles will not exhibit such abrupt changes. As can be seen from FIG. 7, the local powers within the annular zones differ from the lens power by amounts of about 0.3 to over two diopters. Zones with such power profiles are clearly visible with the unarmed emmetropic eye when the lens is held at reading distance.

Figure 8:
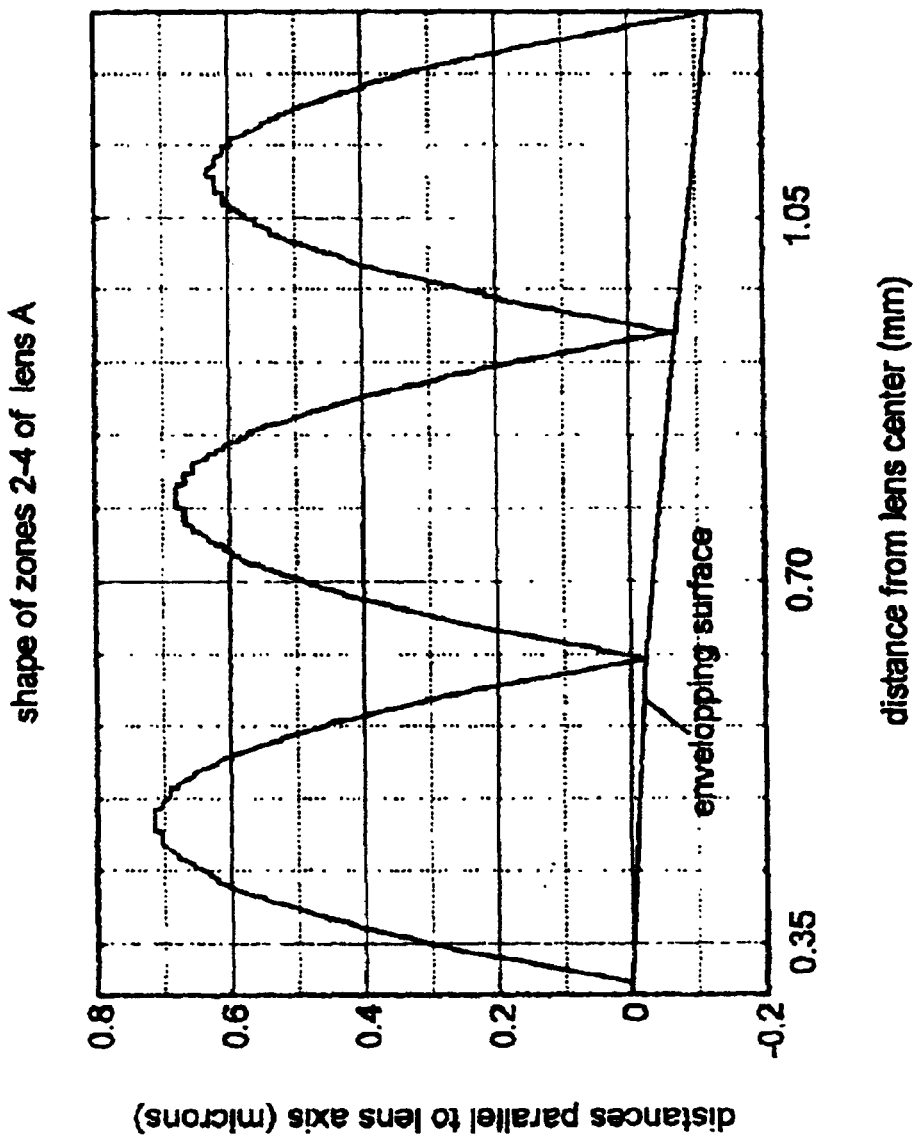
FIG. 8 illustrates the shape of the back surfaces of annular zones of a lens which zones produce cone-shaped wavefronts.

The approximate geometric shape of the lens zones of lens A are shown in FIG. 8. For ease of representation, the back surface of lens A in FIG. 8 was chosen to be 100 mm; then the radii of the back surface of the zones are approximately 17.5 mm. The radii of the back surface of the zones are approximately 5.5 mm, if the lens back radius is 8 mm, consequently the curvature within the grooves assumes values which are considerably different from the curvature of the enveloping surface. These values apply for the case of a lens material with index 1.43 and a refractive index for the tear fluid of 1.336. Zones with radii of 5.5 mm on a surface of average radius of 8 mm are clearly visible with the unarmed emmetropic eye when the lens is held at reading distance.

Figure 9:
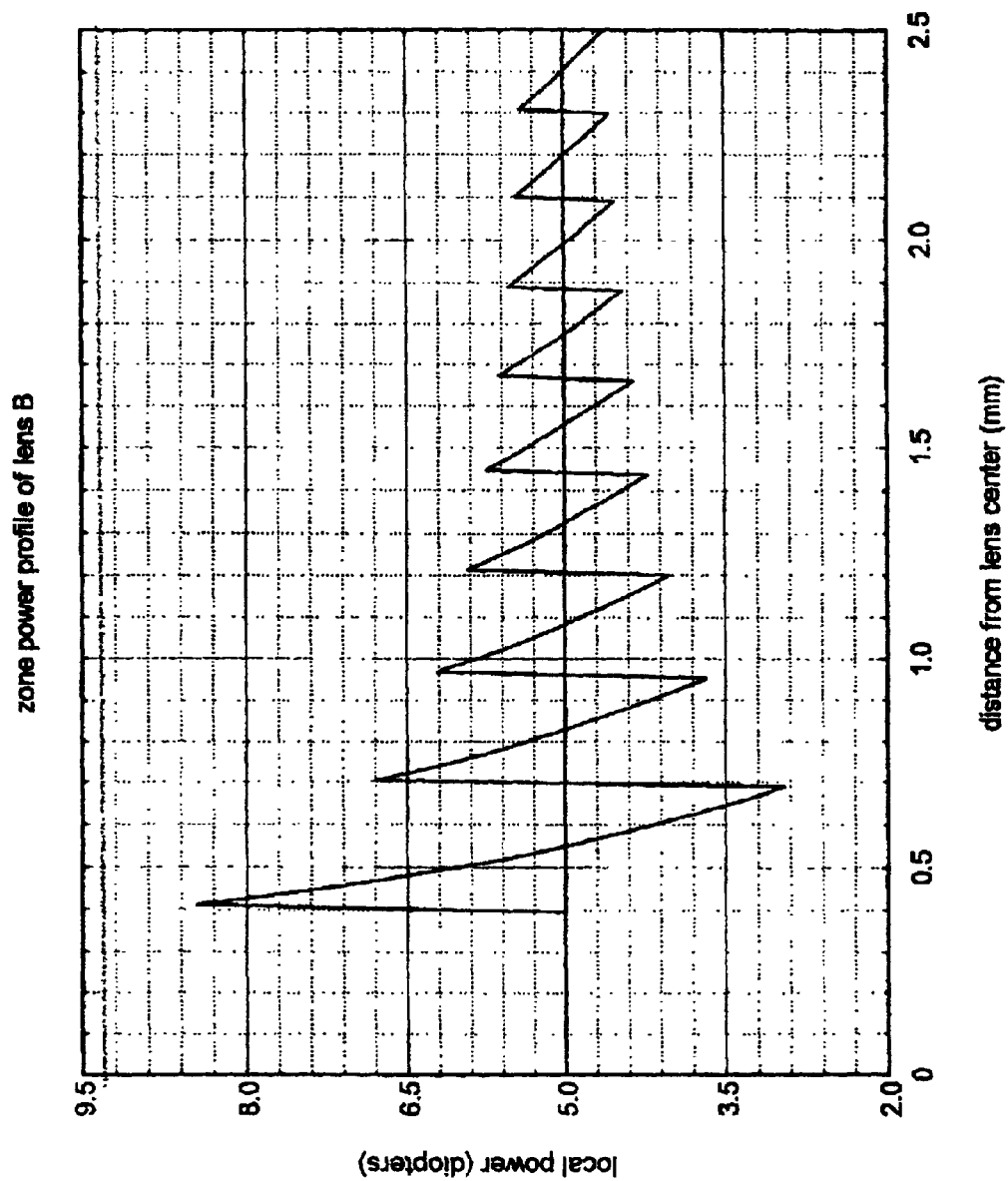
FIG. 9 illustrates zone power profiles of a lens divided into non-Fresnelian zones.

As a second example, a lens of 5 mm diameter exhibiting 10 annular zones is presented; this lens is called "lens B". Again, the zones are chosen to be non-Fresnelian, but contrary to lens A, this lens does not exhibit zones of equal annular widths. The exponent $\alpha$ in equation (9) is chosen to be 0.8. A power profile as shown in FIG. 9 was assumed; this power profile was obtained by doubling the optical path length differences between the spherical wavefront and a cone-shaped wavefront in the center of the zones. As can be appreciated from FIG. 9, the local powers within the zones differ from the lens power by amounts ranging from 0.3 to more than 3 diopters for this lens embodiment. As a consequence, the surface structures of lens B are deeper than is the case with lens A, at least in the inner zones. The maximum depth of the second zone of lens B is 1.08 microns, and the outermost tenth zone exhibits a depth of 0.52 microns. Again, annular zones of this kind are clearly visible with the emmetropic eye when held at reading distance.

Figure 10:
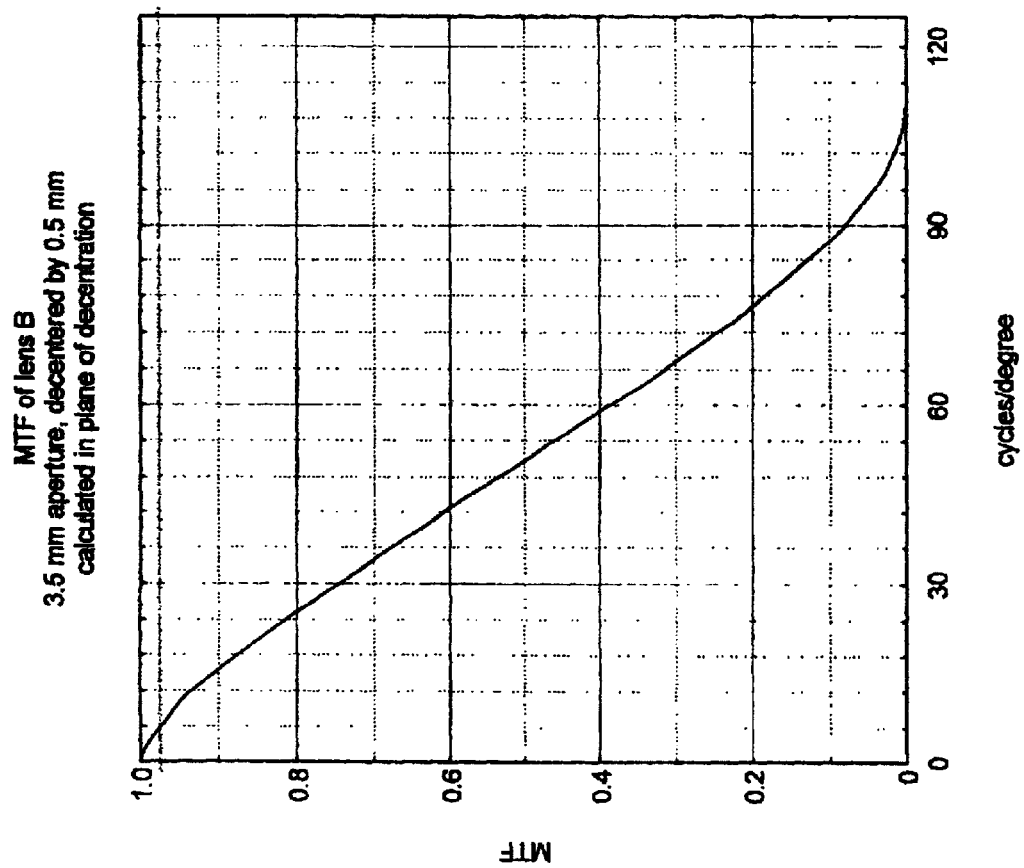
FIG. 10 illustrates the modulation transfer function (MTF) of a lens according to this invention with non-fresnelian zones.

It is mentioned that about 97% of the total intensity is present in the nominal power of lens B. In order to assess the imaging quality of lenses according to this invention, also point spread functions (PSF) and the related modulation transfer functions (MTF) were calculated. FIG. 10 gives an example: this figure shows the MTF for lens B if we assume that an aperture of 3.5 mm aperture is decentered by an amount of 0.5 mm. The MTF was calculated for the case of polychromatic light (rectangular distribution, 450 to 650 nm). As can be seen from FIG. 10, the MTF is that of an ideal monofocal lens.

In the above two examples—lens A and lens B—the annular zones were non-Fresnelian, i.e. considerations of periodicity in $r^2$-space not relevant for the zone power profiles.

In the following, two lenses are discussed which exhibit Fresnelian zones. There are many ways of designing and calculating wavefronts within these zones. As an example, each zone can be divided into two sub-zones, and each of these sub-zones can be attributed a certain power. Then the back radius and the front radius of this sub-zone are determined for any given refractive index of the lens material as a function of the power of this sub-zone. The choice of powers within the sub-zones can be done by trial and error methods using modern computing tools.

As a further example a lens is considered which exhibits 12 Fresnelian zones on a 5.138 mm aperture. If the power profile within the zones were periodic in $r^2$-space, this lens would represent a diffractive lens with a difference of 2 diopters between adjacent powers. In order to suppress any higher order diffractive powers, we now divide any of the zones into two sub-zones each and vary the percentages of the sub-zones within each zone: the first zone is divided into a first annular sub-zone covering 95% of the total zone area, and a second annular sub-zone covering the remaining 5% of the zone area. The twelfth zone is divided into a sub-zone covering 60% and another sub-zone covering 40% of the zone area. The distribution between the two subzones within the intermediate zones is assumed to be interpolated linearly. With this, the zone power profiles are not periodic in $r^2$-space.

Let us consider a lens which should have the power of $-3$ diopters. Table 1 provides an example of useful powers within the first individual sub-zones as follows:

TABLE 1

|  | outer annular zone radius (m) | zone power (D) |
| --- | --- | --- |
| zone 1 | 7.2284E-4 | -2.778 |
|  | 7.4161E-4 | -7.213 |
| zone 2 | 1.0271E-3 | -2.778 |
|  | 1.0488E-3 | -5.488 |
| zone 3 | 1.2599E-3 | -2.778 |
|  | 1.2845E-3 | -4.729 |
| zone 4 | 1.4560E-3 | -2.778 |
|  | 1.4832E-3 | -4.302 |
| zone 5 | 1.6286E-3 | -2.778 |
|  | 1.6583E-3 | -4.029 |

According to Table 1 the first annular sub-zone extending from 0 to 0.72284 mm exhibits the power $-2.778$ diopters, the next annular sub-zone extending from 0.72284 to 0.74161 mm exhibits the power $-7.213$ diopters, and so on. Two adjacent sub-zones comprise a zone. As can be verified, the average power of any zone is equal to $-3$ diopters. As can be seen from Table 1, the larger subzones exhibit powers which are different from the resulting lens power by an absolute amount of 0.222 diopters and the smaller sub-zones exhibit powers which are different from the resulting nominal lens power by an absolute amount of more than one diopter. Zones with these power differences are clearly visible with the unarmed emmetropic eye when held at reading distance.

Figure 11:
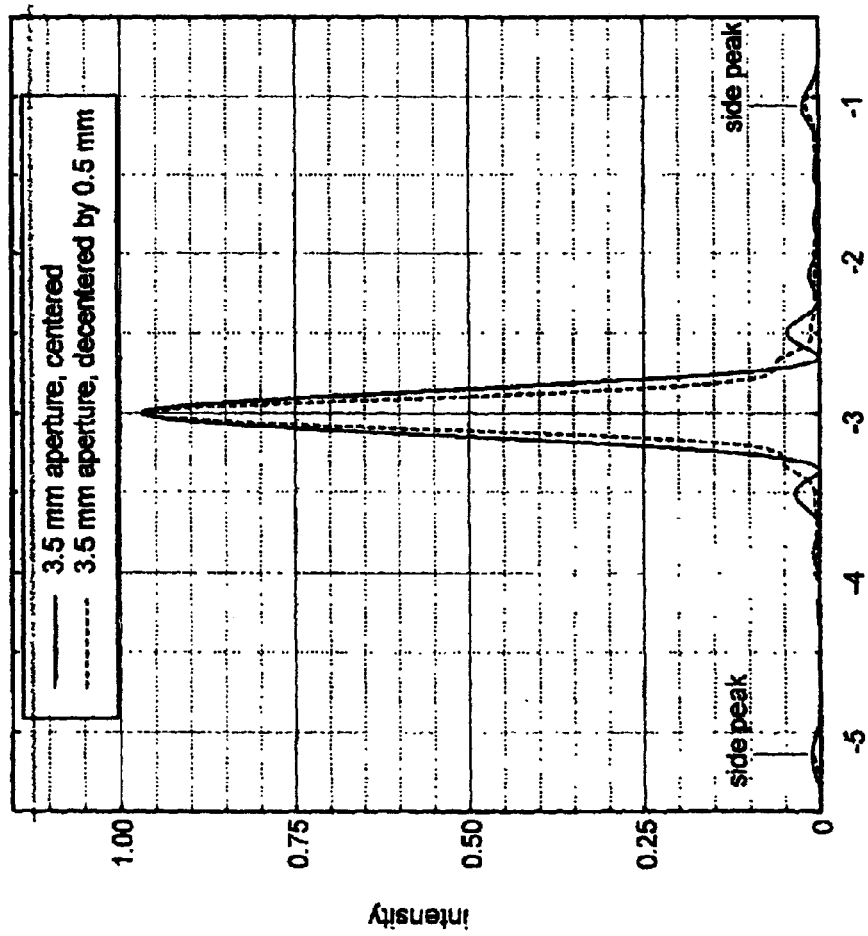
FIG. 11 illustrates TFRs of another lens according to this invention in which the lens is divided into annular zones of equal area, i.e. Fresnelian zones.

Two TFR is for this lens—called lens C—are shown in FIG. 11. As can be seen from FIG. 11, practically all light intensity is directed into the focus of the power of −3 diopters; due to the fact that the zones are Fresnelian zones, minute intensities are present in diffractive side peaks when the TFR are calculated for monochromatic light. In polychromatic light these side peaks would not be visible.

Like any of the lenses according to the present invention, lens C can have the fine surface structures on either the back or the front surface. In Table 2a the parameters are given for a lens with fine structures on the back surface; as before, only the first five zones are shown. The enveloping back radius of this lens is taken to be 8.0 mm, the refractive index of the lens material is assumed to be 1.42 and the refractive index of the tear fluid is assumed to be 1.336.

2.4 mm to 0.84 mm. Such differences of radii within annular zones can easily be seen with the emmetropic eye when the lens is held at reading distance, particularly, if reflected light is used in the examination process. Consequently, the lens would be considered to exhibit a lens error of class 3 according to European Standard EN ISO 9341. However, the invention herein provides an unexpected result of greater lens comfort provided by the hydrodynamics of the fine surface structures n the lens surface(s).

It is assumed that the lens is lathe cut with a diamond needle radius of 0.3 mm. As can be seen from Table 2a, an appropriate needle correction is included in the parameters. As can be seen from the values in the column labeled R12 of Table 2a, the back surface exhibits grooves wherein the local curvature differs essentially from the curvature of the enveloping surface. The curvature of the enveloping surface is $1/8.0 = 0.125$ mm$^{-1}$, whereas the curvature within the grooves assumes values up to $1/0.3 = 3.33$ mm$^{-1}$.

TABLE 2a

| X1 | Y1 | X2 | Y2 | R12 | XQ12 | YQ12 |
|---|---|---|---|---|---|---|
| +0.00000 | +0.00000 | +0.03150 | +0.71690 | +8.17351 | +8.17351 | +0.00000 |
| +0.03150 | +0.71690 | +0.03279 | +0.72881 | +0.30000 | +0.33034 | +0.69059 |
| +0.03279 | +0.72881 | +0.03445 | +0.74162 | +5.72070 | +5.70687 | −0.00000 |
| +0.03445 | +0.74162 | +0.06489 | +1.02204 | +8.17148 | +8.17220 | +0.00000 |
| +0.06489 | +1.02204 | +0.06635 | +1.03222 | +0.30000 | +0.36254 | +0.98452 |
| +0.06635 | +1.03222 | +0.06905 | +1.04881 | +6.49148 | +6.47524 | −0.00000 |
| +0.06905 | +1.04881 | +0.09850 | +1.25554 | +8.16858 | +8.17002 | −0.00000 |
| +0.09850 | +1.25554 | +0.10001 | +1.26437 | +0.30000 | +0.39494 | +1.20943 |
| +0.10001 | +1.26437 | +0.10380 | +1.28452 | +6.90382 | +6.88706 | −0.00000 |
| +0.10380 | +1.28452 | +0.13228 | +1.45208 | +8.16641 | +8.16855 | +0.00000 |
| +0.13228 | +1.45208 | +0.13381 | +1.45995 | +0.30000 | +0.42750 | +1.39874 |
| +0.13381 | +1.45995 | +0.13870 | +1.48324 | +7.15528 | +7.13856 | +0.00000 |
| +0.13870 | +1.48324 | +0.16620 | +1.62506 | +8.16536 | +8.16822 | −0.00000 |
| +0.16620 | +1.62506 | +0.16775 | +1.63223 | +0.30000 | +0.46020 | +1.56535 |
| +0.16775 | +1.63223 | +0.17376 | +1.65831 | +7.32156 | +7.30505 | −0.00000 |

The values in Table 2a have to be read as follows: the points with coordinates (X1,Y1) and (X2,Y2), respectively, are connected by a radius R12; the center coordinates of R12 are given by XQ12 and YQ12. The lens axis is the X-axis for the values in this table. All values are given in mm. As can be seen from the values in Table 2a, the differences between the radii within any of the zones extend from approximately Another embodiment of lens C is a lens with fine structures on the lens front surface. Table 2b shows the parameters for such a lens. Again, the back radius is assumed to be 8 mm and the index of the lens material is 1.42. The center thickness of this lens is assumed to be 0.15 mm, and the vertex of the back surface is assumed to lie in the center of the X-Y-coordinate system.

TABLE 2b

| X1 | Y1 | X2 | Y2 | R12 | XQ12 | YQ12 |
|---|---|---|---|---|---|---|
| −0.15000 | +0.00000 | −0.11894 | +0.72558 | +8.49137 | +8.34137 | −0.00000 |
| −0.11894 | +0.72558 | −0.11876 | +0.72777 | −0.30000 | −0.41785 | +0.75121 |
| −0.11876 | +0.72777 | −0.11735 | +0.74556 | +9.31303 | +9.16579 | −0.00000 |
| −0.11735 | +0.74556 | −0.08721 | +1.03172 | +8.48416 | +8.33398 | +0.00000 |
| −0.08721 | +1.03172 | −0.08698 | +1.03360 | −0.30000 | −0.38498 | +1.06820 |
| −0.08698 | +1.03360 | −0.08454 | +1.05447 | +8.96298 | +8.81619 | +0.00000 |
| −0.08454 | +1.05447 | −0.05531 | +1.26602 | +8.47960 | +8.32924 | −0.00000 |
| −0.05531 | +1.26602 | −0.05507 | +1.26767 | −0.30000 | −0.35195 | +1.31081 |
| −0.05507 | +1.26767 | −0.05156 | +1.29156 | +8.81430 | +8.66759 | −0.00000 |
| −0.05156 | +1.29156 | −0.02326 | +1.46336 | +8.47507 | +8.32451 | +0.00000 |
| −0.02326 | +1.46336 | −0.02301 | +1.46483 | −0.30000 | −0.31876 | +1.51516 |
| −0.02301 | +1.46483 | −0.01843 | +1.49149 | +8.73069 | +8.58392 | +0.00000 |
| −0.01843 | +1.49149 | +0.00894 | +1.63715 | +8.47055 | +8.31978 | −0.00000 |
| +0.00894 | +1.63715 | +0.00920 | +1.63848 | −0.30000 | −0.28540 | +1.69513 |
| +0.00920 | +1.63848 | +0.01487 | +1.66767 | +8.67624 | +8.52932 | +0.00000 |

The parameters of Table 2b have to be read like the ones of Table 2a. Also, an analogous diamond needle correction is included in Table 2b. A comparison between Tables 2a and 2b shows that the fine structures on the front surface are much shallower than the fine structures on the back surface. This is due to the fact that the back fine surface structures have to be calculated for an adjacent medium of higher index (tear fluid with 1.336 refractive index) than the front fine structures (air with index 1). The front surface structures are difficult to discern with the unarmed eye, but become visible under a microscope with 6 times magnification. The visibility of these surface structures would therefore correspond to a lens error of class 2 according to European Standard EN ISO 9341. Again, the unexpected result of the surface structures is increased comfort for the wearer.

It is therefore apparent from the values of Table 2b that the values of the curvature within the grooves differ considerably from the value of the curvature of the enveloping surface of radius 8.0 mm. These fine surface structures on the lens front surface provide superior lubrication during blinking and thus greater comfort for the lens wearer.

A lens with Fresnelian zones and in $r^2$-space periodic power profiles within these zones is discussed. By design, such a lens is a diffractive lens with more than one power. It can, though, be achieved that light is essentially only directed into the zeroth order diffractive power, i.e. the refractive power of such a lens. By way of example we consider a lens with essentially all light being directed into the focus of a power of −3 diopters. Again, we assume a lens diameter of 5.138 mm covered by 12 Fresnelian zones. This lens is called lens D.

Table 3 shows the power profiles of the first five zones of lens D in analogy of the data of Table 1.

TABLE 3

|        | outer annular zone radius (m) | zone power (D) |
|--------|-------------------------------|----------------|
| zone 1 | 7.0356−4                      | 2.7370         |
|        | 7.4161−4                      | 5.3664         |
| zone 2 | 1.022E−3                      | −2.7370        |
|        | 1.048E−3                      | −5.3664        |
| zone 3 | 1.262E−3                      | −2.7370        |
|        | 1.284E−3                      | −5.3664        |
| zone 4 | 1.464E−3                      | −2.7370        |
|        | 1.483E−3                      | −5.3664        |
| zone 5 | 1.641E−3                      | −2.7370        |
|        | 1.658E−3                      | −5.3664        |

Figure 12:
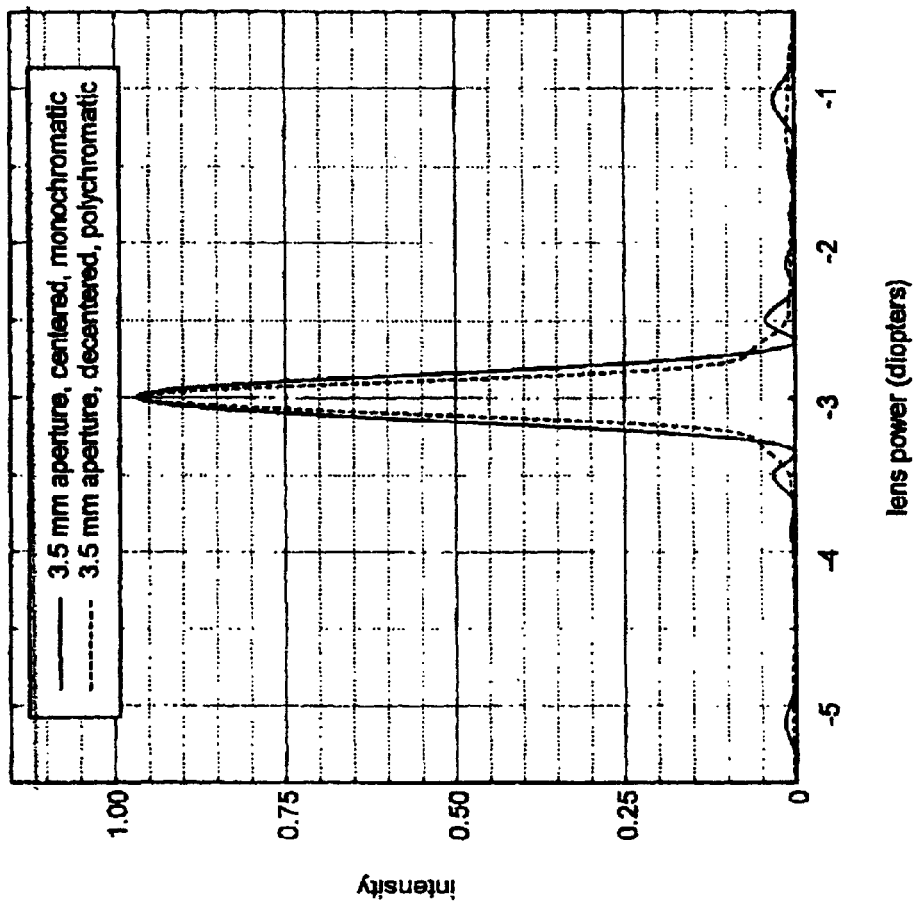
FIG. 12 illustrates the TFRs of still another lens according to this invention in which the lens is divided into Fresnelian annular zones and the zones exhibit power profiles which are periodic in $r^2$-space.

As is apparent from Table 3, the power profiles of the zones are periodic in $r^2$-space which condition applies for diffractive multifocal lenses. But due to the choice of these particular power profiles, the lens is essentially a monofocal lens, as can be appreciated from the results illustrated in FIG. 12. Also apparent from FIG. 12 is the fact that the lens exhibits minute diffractive side peaks if the TFR is calculated for monochromatic light; these side peaks virtually vanish in polychromatic light. A lens exhibiting annular zones in which the power changes from −2.737 to −5.3664 is clearly identified as a zoned lens by the unarmed emmetropic eye when held at reading distance. It is again noted that the power within the zones or grooves differs considerably from the resulting nominal power of the lens.

Again, such a lens can be made to exhibit front surface structures or back surface structures, or both. The parameters of a lens with back surface structures are shown for the first five zones in Table 3a in analogy with Table 2a.

TABLE 3a

| X1       | Y1       | X2       | Y2       | R12      | XQ12     | YQ12     |
|----------|----------|----------|----------|----------|----------|----------|
| +0.00000 | +0.00000 | +0.02992 | +0.70015 | +8.20574 | +8.20574 | −0.00000 |
| +0.02992 | +0.70015 | +0.03059 | +0.70699 | +0.30000 | +0.32883 | +0.67455 |
| +0.03059 | +0.70699 | +0.03445 | +0.74162 | +6.53855 | +6.53081 | +0.00000 |
| +0.03445 | +0.74162 | +0.06418 | +1.01734 | +8.20397 | +8.20483 | +0.00000 |
| +0.06418 | +1.01734 | +0.06558 | +1.02717 | +0.30000 | +0.36187 | +0.98014 |
| +0.06558 | +1.02717 | +0.06905 | +1.04881 | +6.55268 | +6.53725 | −0.00000 |
| +0.06905 | +1.04881 | +0.09860 | +1.25695 | +8.20135 | +8.20306 | +0.00000 |
| +0.09860 | +1.25695 | +0.10070 | +1.26890 | +0.30000 | +0.39506 | +1.21098 |
| +0.10070 | +1.26890 | +0.10380 | +1.28452 | +6.57158 | +6.54862 | −0.00000 |
| +0.10380 | +1.28452 | +0.13318 | +1.45773 | +8.19927 | +8.20182 | −0.00000 |
| +0.13318 | +1.45773 | +0.13598 | +1.47141 | +0.30000 | +0.42840 | +1.40440 |
| +0.13598 | +1.47141 | +0.13870 | +1.48324 | +6.58738 | +6.55693 | +0.00000 |
| +0.13870 | +1.48324 | +0.16791 | +1.63406 | +8.19721 | +8.20061 | −0.00000 |
| +0.16791 | +1.63406 | +0.17140 | +1.64918 | +0.30000 | +0.46189 | +1.57426 |
| +0.17140 | +1.64918 | +0.17376 | +1.65831 | +6.60302 | +6.56515 | +0.00000 |

Figure 13:
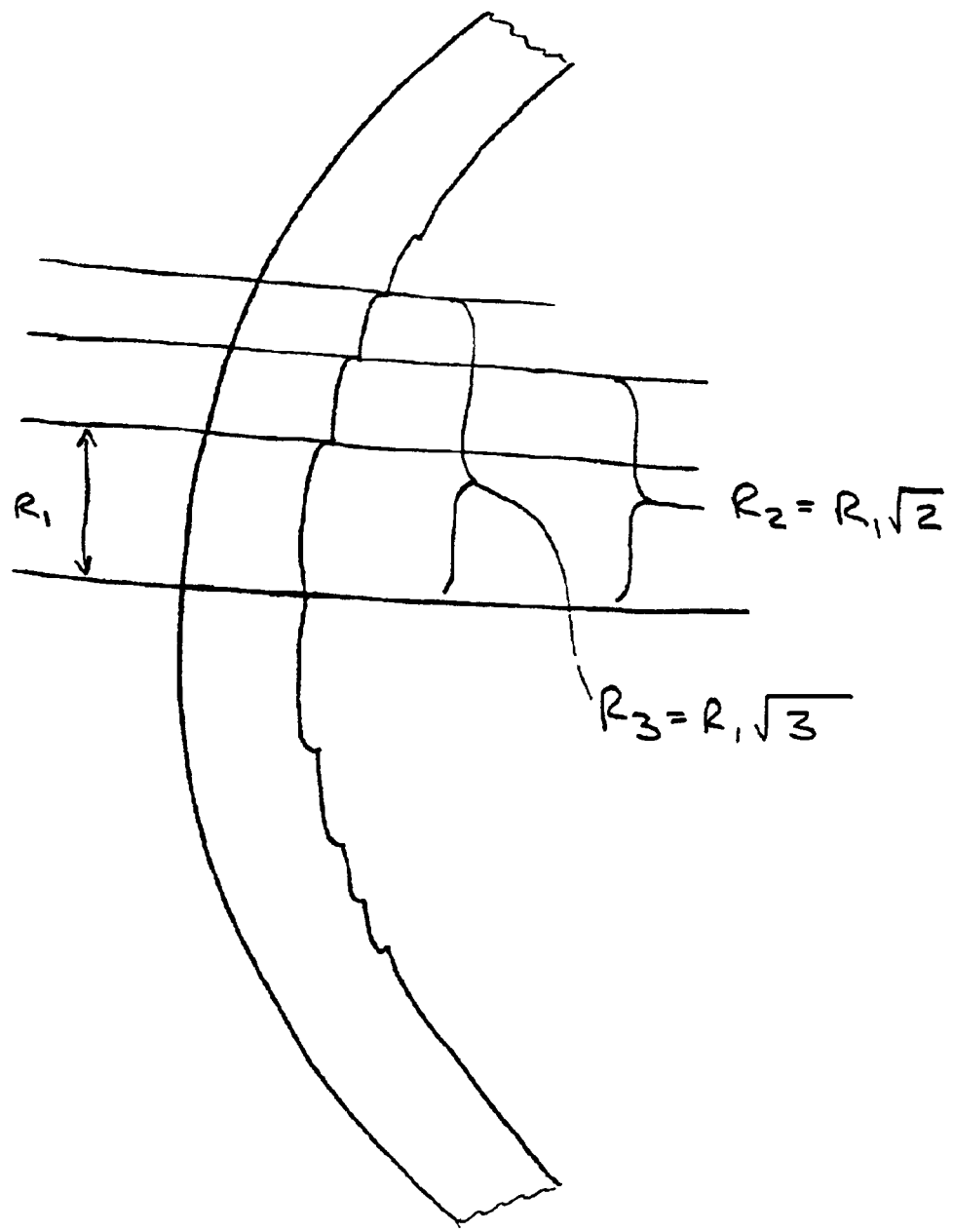
FIG. 13 illustrates the inner section of a contact lens according to this invention with fine structures on the lens back surface.

The enveloping back radius of this lens is again 8 mm, the lens index is 1.42, like before. As can be appreciated from the values of Table 3a, the back surface of this lens has an appearance similar to fish scales, as shown schematically in FIG. 13. Still the lens performs essentially like a monofocal lens.

With the examples given it is demonstrated that an ophthalmic lens may exhibit properly designed surface structures without compromising the optical performance of the lens. Surface structures according to the present invention may be given to rigid or soft lenses, as well as to monofocal or multifocal lenses. A special situation arises in the case of diffractive multifocal lenses, which exhibit already surface structures, usually present on the lens back surface. A diffractive lens exhibiting any of the discussed fine surface structures on the opposite side of the diffractive surface fall within the scope of the present invention.

In general, a multifocal lens—either of the diffractive or any other, e.g. refractive design—exhibits one surface with some kind of surface structures and an opposite smooth lens surface. Adhering to the power profile concept, as discussed above, we may consider the surface power may be expressed by (n−1)/R of the conventionally smooth surface of the multifocal lens, wherein n is the lens index and R is the radius of this smooth surface. This surface power is a constant in conventional lenses. A surface structure according to the present invention is then characterized by the fact that the surface power within annular surface zones differs essentially from the average surface power of these annular zones. With this, the individual wave front associated with any annular zone is different from the wavefront associated with this average surface power and characterized by a function f(x), as demonstrated in FIG. 1 and equations 1,2,4,5,5' and 6.

Although lenses of only a few different powers were discussed in the present disclosure, the general considerations about surface structures apply to lenses of any other power. This will be understood by consideration of the fact that the resulting lens power can deliberately be changed by changing the curvature of one of the lens surfaces. By way of example, the structured back surface according to this invention with a back radius of e.g. 8 mm designed for a lens of 5 diopters can as well be used for a lens with 8 mm back radius and power of e.g. −6 diopters.

Although examples of contact lenses have been given in this disclosure, the invention also encompasses intra-ocular lenses. To one knowledgeable in the art the application of the discussed principals to intra-ocular lenses and ophthalmic lenses in general is immediately apparent. Lubrication implications are irrelevant in the case of intra-ocular lenses, but potentially superior objective optical performance of lenses with fine surface structures may suggest such structures even in the case of implanted ophthalmic lenses.

Lenses according to the present invention were produced on a polish free diamond lathe (EPT Optomatic) and tested in vivo. Both soft and rigid contact lenses were examined and compared against standard monofocal lenses made on the same lathe and from the same lens material. Visual performance of the lenses according to this invention was equal with or better than visual performance with the standard monofocal design. Some test persons reported superior lens comfort with the lenses according to the present invention. Subjective superior lens comfort appears to correlate with subjective improved visual performance with the lenses according to this invention.

It is noted that in the case of lathed lenses or lenses produced from lathed molds, the radius of an annular zone changes by minute amounts, when the lens (or mold) is cut with a non-zero feed rate throughout. The change of the annular radius, measured in an angular position of 0° and 360°, respectively, is given by f/U, wherein f is the feed rate and U the angular speed of the lathe. By way of example, the annular radius of a zone changes by an amount of 1 micron, if the feed rate is 4 mm/min and the angular speed is 4000 revolutions/min; these values for f and U are typical values. As will be appreciated, such changes in annular radius are extremely small. Consequently, a substantially annular radius produced on a lathe with non-zero feed rate is to be considered an "annular" radius pursuant to the invention.

Figure 14A:
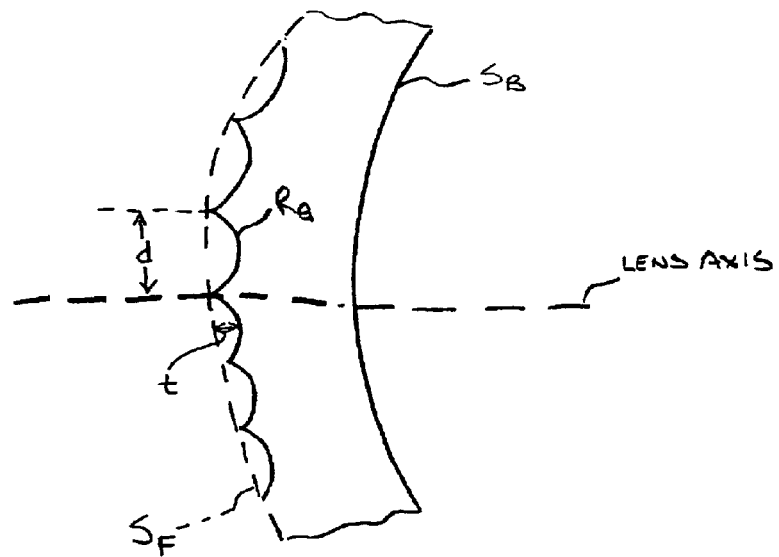
FIG. 14a illustrates the front surface of a lens according to this invention in which the lens exhibits grooves on the front surface and in which the cross section of the grooves is circular.
Figure 14B:
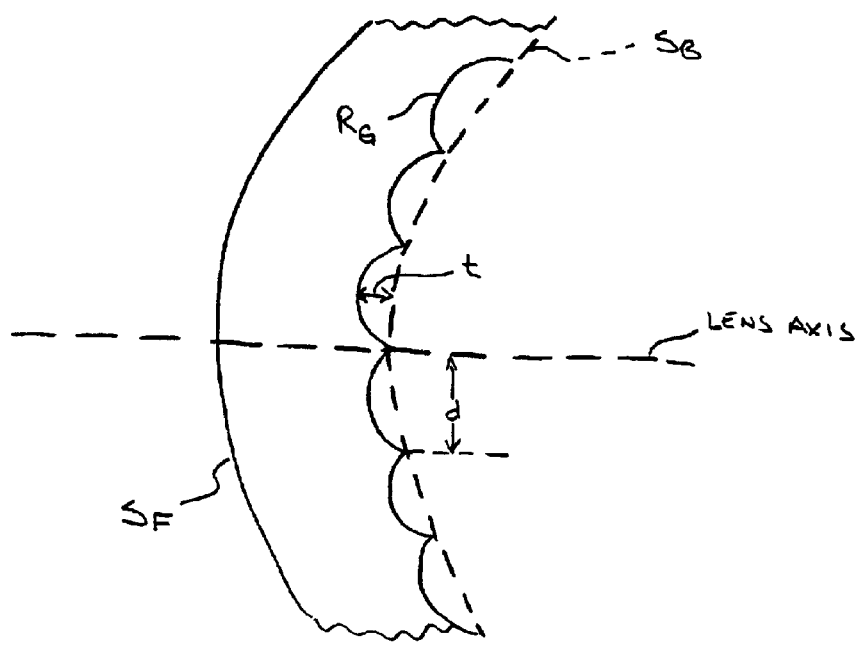
FIG. 14b illustrates the back surface of a lens according to the present invention in which the lens exhibits grooves on the back surface and in which the cross section of the grooves is circular.

Many lenses formed in accordance with the present invention were designed and analyzed. In these analyses, lenses were considered which exhibited annular grooves on either the front or the back surface or on both surfaces. Grooves of various geometric shapes and depths as well as grooves of various widths according to above Equation 9 were analyzed. In particular, lenses featuring grooves with a circular cross-section according to FIG. 14a and 14b were investigated. In FIG. 14a, a lens is shown schematically which exhibits grooves of circular cross section on the front surface. The value t is the maximum depth of the groove relative to the front surface $S_F$ of a standard lens without grooves, d is the width of the groove and $R_G$ is the radius of the grooves of circular cross section. In FIG. 14b the grooves are on the back surface of a lens. $S_B$ is the back surface of a standard lens without grooves.

Certain semi-empirical relations could be derived from these analyses:

1. The resulting intensity P in the nominal power of the lens depends essentially only on the maximum depth t of the grooves, t being the maximum difference between the smooth reference surface ($S_F$ or $S_B$) and the surface of a groove. As always, the smooth reference surface is the enveloping surface of the groove surface structures. The nominal power is the power of a comparable lens which exhibits a smooth front surface $S_F$ and a smooth back surface $S_B$. Both smooth front and back surfaces are determined by standard state of the art methods. Any of the smooth surfaces may also be an aspheric surface characterized by a radius and a value for the excentricity of the asphere, as is known from state of the art lens design methods.
2. The resulting intensity of a lens with a surface which exhibits grooves is essentially independent of the width d of the grooves.
3. Calling the resulting intensity of a lens with surface fine structures on the front surface and a smooth back surface $P_F$, and, by analogy, the intensity of a lens with surface fine structures on the back surface and a smooth front surface $P_B$, the intensity $P_L$ of a lens with fine structures on both front and back surface, respectively, will essentially be given by:

$$P_L = P_F * P_B \quad (10)$$

Referring more specifically to the first semi-empirical relationship above, it was found that the change in peak intensity ΔP (in %) in the nominal lens power and the maximum geometric depth t of the grooves on one surface of the lens are essentially interrelated by the equation:

$$\ln(\Delta P) \approx 2 \ln(t) + C \quad (11)$$

wherein C is a constant. Equation 11 applies essentially for a light wavelength which is the average of the visible light wavelength spectrum.

With these considerations lenses can be designed which exhibit many annular grooves on either the front or the back surface or on both surfaces. As an example, a soft bifocal lens is considered which is made from a hydrogel of refractive index 1.42. The lens diameter is assumed to be 14 mm. The lens should exhibit annular grooves both on the front and on the back surface; the radius of the circular cross section of the grooves should be 0.5 mm both for the grooves on the front and back surface. The groove widths should not be constant in this example; an exponent α=0.95 is chosen for the width of the front grooves (see Equation 9 above) and an exponent α=1.05 for the grooves on the back surface. With these parameters the lens will exhibit 305 annular grooves on the front surface, the innermost groove being 0.0306 mm wide and t=0.12 microns deep, the outmost grooves being 0.0219 mm wide and again 0.12 microns deep; the back surface will exhibit 106 grooves, the innermost groove being 0.0528 mm wide and 0.7 microns deep, the outermost groove being 0.07 mm wide and also 0.7 microns deep.

For the purpose of illustration, the grooves of this example would be associated with at least #20 scratches according to military specification MIL-0-13830 A (see: www.torusoptics.com/optical_specifications.com). In the above example, these grooves or scratches are present on the entire surface of the lens, i.e. they would not be considered a local lens defect. Also, the grooves of this example would produce wavefront errors in excess of λ/14, a value which is considered the acceptable maximum of wavefront errors due to local surface imperfections. As will be appreciated, the wavefront error produced by a groove of depth t is given by $t(n_L-n_i)$, wherein $n_L$ is the refractive index of the surface material (i.e., the lens), and $n_i$ is the refractive index of the medium within the groove. Accordingly, it will be understood by those skilled in the art that the surface structures of the present invention are greater (in either depth, width or both dimensions) than the surface imperfections made by a high speed lathe. Stated differently, the surface structures of the present invention may be in the form of annular grooves of a depth t measured from an envelope comprising a smooth curve at a surface upon which the surface structures are formed. A value $t(n_L-n_i)$ must be greater than $\lambda/14$, wherein $\lambda$ is the wavelength of light, $n_L$ is the refractive index of the lens and $n_i$ is the refractive index of the medium within the groove, e.g., tear fluid.

Lenses according to these specifications were lathed on a high precision polish free diamond lathe and tried by a number of test persons. Lens comfort was termed decisively superior when compared with lenses of identical basic design but without grooves, surface structures, i.e., on the lens surfaces. Subjective visual performance was also termed superior when compared to the standard state of the art lenses. It is uncertain if these subjective optical results may have been influenced by the increased comfort of the lenses with structured surfaces.

Figure 15A:
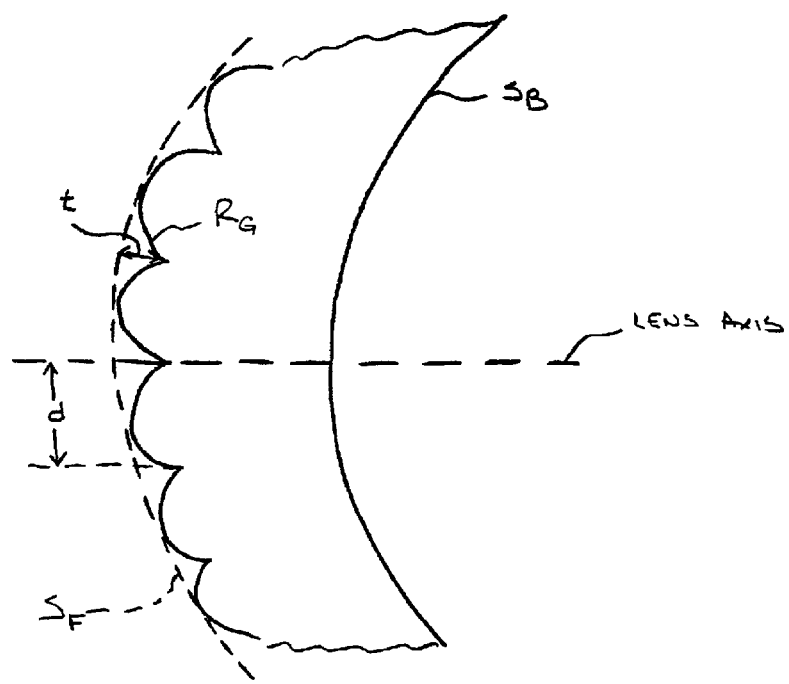
FIG. 15a illustrates another type of grooves on the front surface of a lens according to the present invention.
Figure 15B:
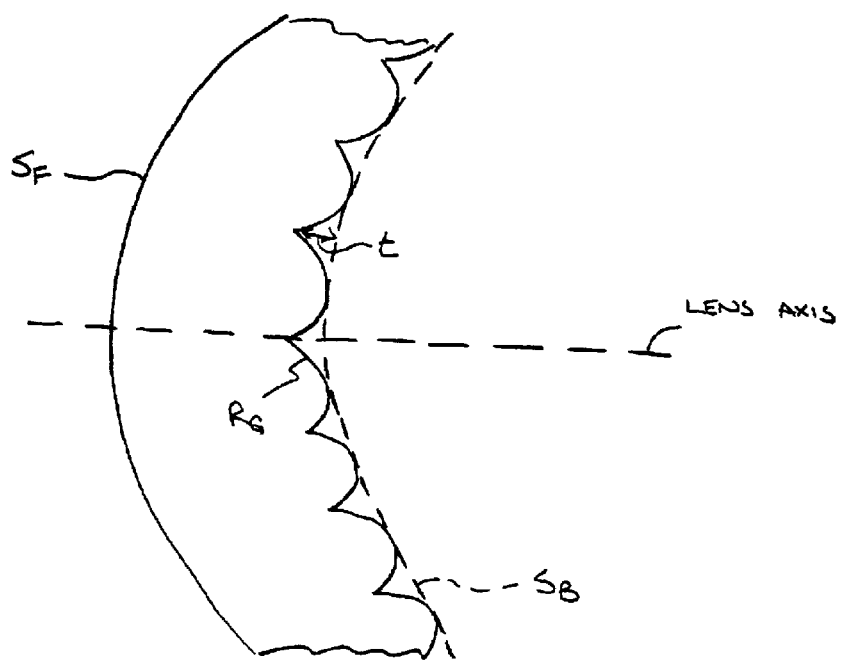
FIG. 15b illustrates another type of grooves on the back surface of a lens according to the present invention.

It will be appreciated that analogous considerations for the optical performance of lenses with structured surfaces apply, if the grooves are substantially V-shaped, as shown schematically in FIGS. 15a and 15b. In FIG. 15a the V-shaped grooves are on the front surface; in FIG. 15b the grooves are on the back surface of a lens according to the present invention; the values t, d and $R_G$ are again the groove depth, the groove width and the radius of the circular cross section, respectively. As noted above, the determining factor for the available intensity in the nominal power of the lens is the depth t of the grooves. The shape of the cross section of the grooves is not a determining factor. These considerations are of importance for lenses which are molded or spin cast.

Opththalmic lenses are either molded, spin cast or lathed. Earlier lathes required subsequent polishing of the lens surface in order to achieve the required optical smoothness. The surface roughness of polished ophthalmic lenses is in the order of 25 nanometers (nm), see e.g.:EPT: Vision in precision, Optomatic—An innovative approach to lens production, NL-7602 KL Almelo, The Netherlands). Polish free sub-micron lathes, like the EPT Optomatic, produce surfaces of roughness of about 9 to 15 nm. (see: EPT, loc.cit.). Typical feed rates used in such polish free lathes are 4000 rev/min, and moving across the stock at 4 mm/min. With these values, lathing grooves of about 1 micron wide are produced on the lathe cut surface; the cross section of such lathing grooves is essentially circular, the radius of these circular cross section corresponding to the radius of the diamond tool of the lathe. Surfaces the quality of which can be achieved by lathing on polish free sub-micron lathes do not provide sufficient roughness to achieve the desired lens comfort. Accordingly, the surface structures of the present invention provide a greater surface area for the lubricant between the cornea surface and the lens surface.

Master molds for lens molding or spin casting are usually also lathed on polish free submicron lathes. Since these master molds are usually made of metal, and since metals can be polished to a higher degree of perfection than contact lens polymers, such molds are occasionally polished in order to achieve a still smoother surface than available from the lathe cut. In any case, molded or spin cast lenses exhibit a surface finish which is better than or comparable with the surface finish of lenses lathed on polish free sub-micron lathes and thus do not provide the desired surface structures contemplated by the present invention.

In view of Equation 11, it will be understood that a lens with structured surfaces according to the present invention will exhibit one or more surfaces which may be deemed "optically not smooth" or exhibiting a lens error according to European Standard EN ISO 9341. For the uneducated consumer, acceptance of such lenses may therefore be lower than that of conventional lenses.

If it is desired to avoid such a possible reduction in lens acceptance, the optical center portion of a lens, particularly a contact lens, can be made smooth like a conventional lens, while the remaining surfaces of the lens exhibit surface structures according to the present invention. The optical center portion of a contact lens corresponds to the size of the pupil. Thus, the optically relevant center portion of a soft contact lens exhibits a diameter of typically 6 to 8 mm, while the lens exhibits a diameter of typically over 14 mm. Consequently, the non-optical surface of the lens is larger than the optical surface by a factor between 3 and 6, if it is taken into account that the lens exhibits an approximately spherical shape. In the case of a rigid contact lens, this factor will be somewhat smaller. In any case, the non-optical surface of a lens is generally at least 40% of the entire lens surface.

From these considerations it can be concluded that it is possible to combine the increased comfort of a lens surface with surface structures according to the present invention with the known and well-established optical performance of a standard state of the art lens.

These considerations apply both for lenses with annular grooves on one or both non-optical surfaces. As will be appreciated, no optical restrictions whatsoever apply on the design and pattern of surface structures within the non-optical part of a lens. Positive or negative molds which, as discussed above, are used in lens molding or spin casting can be made accordingly.

Figure 16:
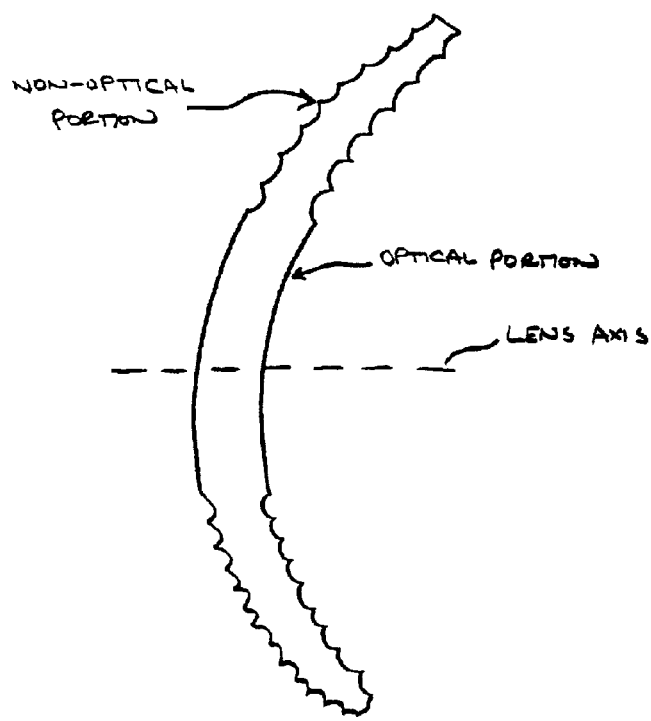
FIG. 16 illustrates the cross section of a lens according to the present invention in which the optical portion of the lens surfaces are smooth and in which the non-optical portions of the lens exhibit grooves.
Figure 17:
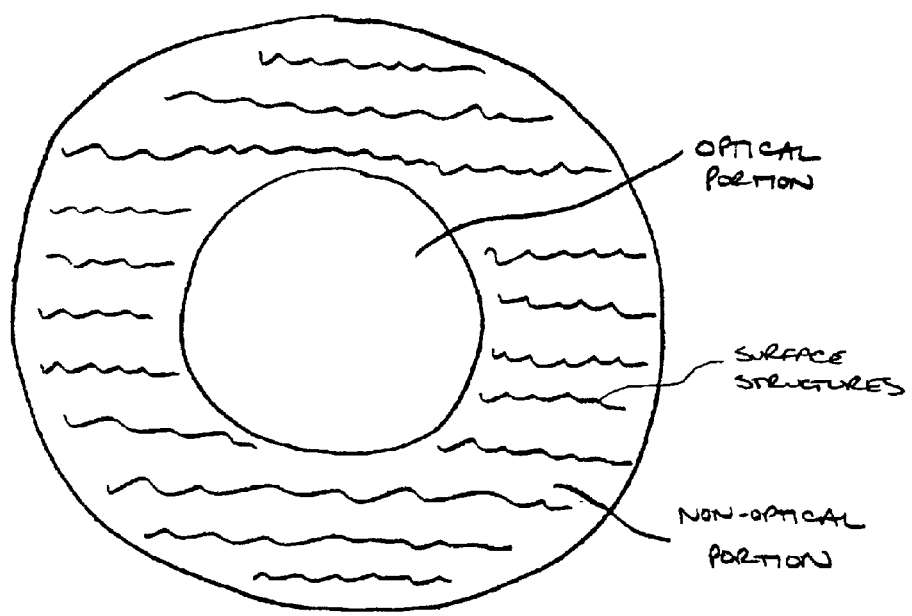
FIG. 17 illustrates the front view of an alternative embodiment of a lens according to the present invention in which the optical portion of the lens surfaces are smooth and surface structures are provided on the non-optical portions of the lens.

FIGS. 16 and 17 show schematically a lens which exhibits surface structures only on the non-optical part of the lens, while the optical center part of the lens exhibits smooth front and back surfaces, respectively. The optical center part of such a lens may also be formed as a bi- or multifocal lens, e.g., exhibit refractive or diffractive bifocal optics.

Since optical considerations are irrelevant for the non-optical portions of a contact lens, surface structures on the non-optical part of a contact lens may exhibit any shape and geometry; an example is given in FIG. 17. A lens according to this invention is therefore characterized by the fact that the conventional central optical portion of this lens is surrounded by a non-optical portion which exhibits surface structures or irregularities of any kind. These surface irregularities may be present on the non-optical portion of the front surface or of the back surface or be present on the non-optical portions of both front and back surface of the lens.

Although illustrative embodiments of the present invention have been described herein with reference to the accompanying figures, it is to be understood that the invention is not limited to those precise embodiments, and that various other changes and modifications may be effected by one skilled in the art without departing from the scope of the invention.

What is claimed is:

1. A monofocal contact lens comprising:
 a front surface having a substantially convex shape associated therewith; and a back surface having a substantially concave shape associated therewith;

wherein at least one of the front and back surfaces is not substantially smooth and includes means for increasing a surface area thereof to provide improved lens wearer comfort, and further wherein the means for increasing a surface area comprises surface structures provided by a plurality of substantially annular grooves which include a depth t measured from an envelope comprising a smooth curve at said surface such that a value $t(n_L-n_i)$ is larger than $\lambda/14$, being a wavelength of light, $n_L$ being the refractive index of the lens, and $n_i$ being the refractive index of the medium within the groove.

2. A monofocal contact lens as defined in claim 1, wherein each substantially annular groove includes a substantially circular cross-section.

3. A monofocal contact lens as defined in claim 1, wherein each substantially annular groove includes a non-circular cross-section.

4. A monofocal contact lens as defined by claim 1, wherein a width of said grooves is a constant.

5. A monofocal contact lens as defined by claim 1, wherein the width of said grooves is dependent on an annular radius of said grooves.

6. A monofocal contact lens as defined in claim 1, wherein both the front and back surfaces include means for increasing a surface area.

7. A monofocal contact lens as defined in claim 1, wherein the means for increasing a surface area includes surface structures provided on at least 40% of said surface, the at least 40% being measured by an area of an envelope comprising a smooth curve over said surface.

8. A monofocal contact lens as defined by claim 1, wherein the means for increasing a surface area includes surface structures provided on both an optical portion and non-optical portion of the lens.

9. A multifocal contact lens comprising:

a front surface of substantially convex shape;

a back surface of substantially concave shape; and surface structure optics provided on one of the front and back surfaces;

wherein the surface not including the surface structure optics includes means for increasing a surface area thereof to provide increased lens wearer comfort, and further wherein the means for increasing a surface area includes surface structures comprising a plurality of substantially annular grooves which include a depth t measured from an envelope comprising a smooth curve at said surface such that a value $t(n_L-n_i)$ is larger than $\lambda/14$, being a wavelength of light, $n_L$ being the refractive index of the lens, and $n_i$ being the refractive index of the medium within the groove.

10. A multifocal contact lens as defined in claim 9, wherein each substantially annular groove includes a substantially circular cross-section.

11. A multifocal contact lens as defined in claim 9, wherein each substantially annular groove includes a non-circular cross-section.

12. A multifocal contact lens as defined by claim 9, wherein a width of said grooves is a constant.

13. A multifocal contact lens as defined by claim 9, wherein the width of said grooves is dependent on an annular radius of said grooves.

14. A multifocal contact lens as defined by claim 9, wherein the means for increasing surface area is provided on any non-optical portion of said contact lens.

15. A multifocal contact lens as defined by claim 9, wherein the annular grooves comprise any shape and any geometry.

16. An ophthalmic lens of power D, comprising:

at least two substantially annular zones wherein a refractive power within any of said annular zones is a variable according to a power profile, wherein an average refractive power within any of said substantially annular zones is substantially equal to D and wherein the difference between a maximum value and a minimum value of said power profile within at least one zone is greater than one diopter.

17. An ophthalmic lens as defined in claim 16, wherein said refractive powers within said substantially annular zones are different from said power D.

18. An ophthalmic lens as defined in claim 16, wherein the substantially annular zones are Fresnelian type zones.

19. An ophthalmic lens as defined in claim 16, wherein the substantially annular zones are non-Fresnelian type zones.

20. An ophthalmic lens as defined in claim 16, wherein the outer bonding radius $R_j$ of the j-th zone is given by $R_j=R_1 \times j^\alpha$, $R_1$ being the outer bonding radius of the innermost zone and wherein $\alpha$ is a constant.

21. An ophthalmic lens as defined in claim 16, wherein the lens is a contact lens.

22. An ophthalmic lens as defined in claim 16, wherein the lens in an intra-ocular lens.

23. An ophthalmic lens as defined in claim 16, wherein the lens is a bifocal ophthalmic lens and wherein said power D is one of the powers of the bifocal lens.

24. An ophthalmic lens as defined in claim 16, is a multifocal lens and wherein said power D is one of the powers of the multifocal lens.

25. A multifocal diffractive lens comprising annular zones exhibiting periodic power profiles in $r^2$-space, wherein a light intensity in a zeroth diffractive order is at least 90% of a total transmitted light intensity.

* * * * *